(12) United States Patent
Vaidyanathan et al.

(10) Patent No.: US 9,977,206 B2
(45) Date of Patent: May 22, 2018

(54) ASYNCHRONOUS DISTRIBUTED OPTICAL MUTUAL EXCLUSION INTERCONNECT AND METHOD

(71) Applicant: Board of Supervisors of Louisiana State University and Agricultural and Mechanical College, Baton Rouge, LA (US)

(72) Inventors: Ramachandran Vaidyanathan, Baton Rouge, LA (US); Ahmed Bahaa Mansour, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days. days.

(21) Appl. No.: 15/603,401

(22) Filed: May 23, 2017

(65) Prior Publication Data

US 2017/0336586 A1    Nov. 23, 2017

Related U.S. Application Data

(60) Provisional application No. 62/340,248, filed on May 23, 2016.

(51) Int. Cl.
| | |
|---|---|
| *G02B 6/42* | (2006.01) |
| *G02B 6/125* | (2006.01) |
| *G02B 6/293* | (2006.01) |
| *G02F 1/01* | (2006.01) |

(52) U.S. Cl.
CPC .......... *G02B 6/4295* (2013.01); *G02B 6/125* (2013.01); *G02B 6/29338* (2013.01); *G02B 6/4246* (2013.01); *G02F 1/011* (2013.01)

(58) Field of Classification Search
CPC .... G02B 6/4295; G02B 6/4246; G02B 6/125; G02B 6/29338; G02B 6/2934; G02B 6/29341; G02B 6/29343; G02F 1/011
See application file for complete search history.

(56) References Cited

U.S. PATENT DOCUMENTS

2016/0291251 A1* 10/2016 Tu ...................... G02B 6/29395

OTHER PUBLICATIONS

Ashrafi, Arash, et al., "An Architechture for Configuring an Efficient Scan Path for a Subset of Elements", (2016), 10 pgs.

* cited by examiner

*Primary Examiner* — John M Bedtelyon
(74) *Attorney, Agent, or Firm* — John B. Edel; Edel Patents LLC

(57) ABSTRACT

A system and method for using the system includes a first and second waveguide and optical receiver elements coupled therebetween. The optical receiver elements include a microring configured to admit light from and transfer light to at least one of the first and second waveguides, a photodetector, coupled to the microring, configured to detect light admitted to the microring, and an enable circuit, coupled to the microring, configured to be switched between a light admitting state to enable light to be admitted to the microring and a light rejection state to prevent light from being admitted to the microring. Each optical receiver element has a relative priority and are configured to asynchronously arbitrate among themselves for a token to place one of the enable circuits in the light admitting state to enable one of the optical receiver elements to receive and transmit data.

20 Claims, 12 Drawing Sheets

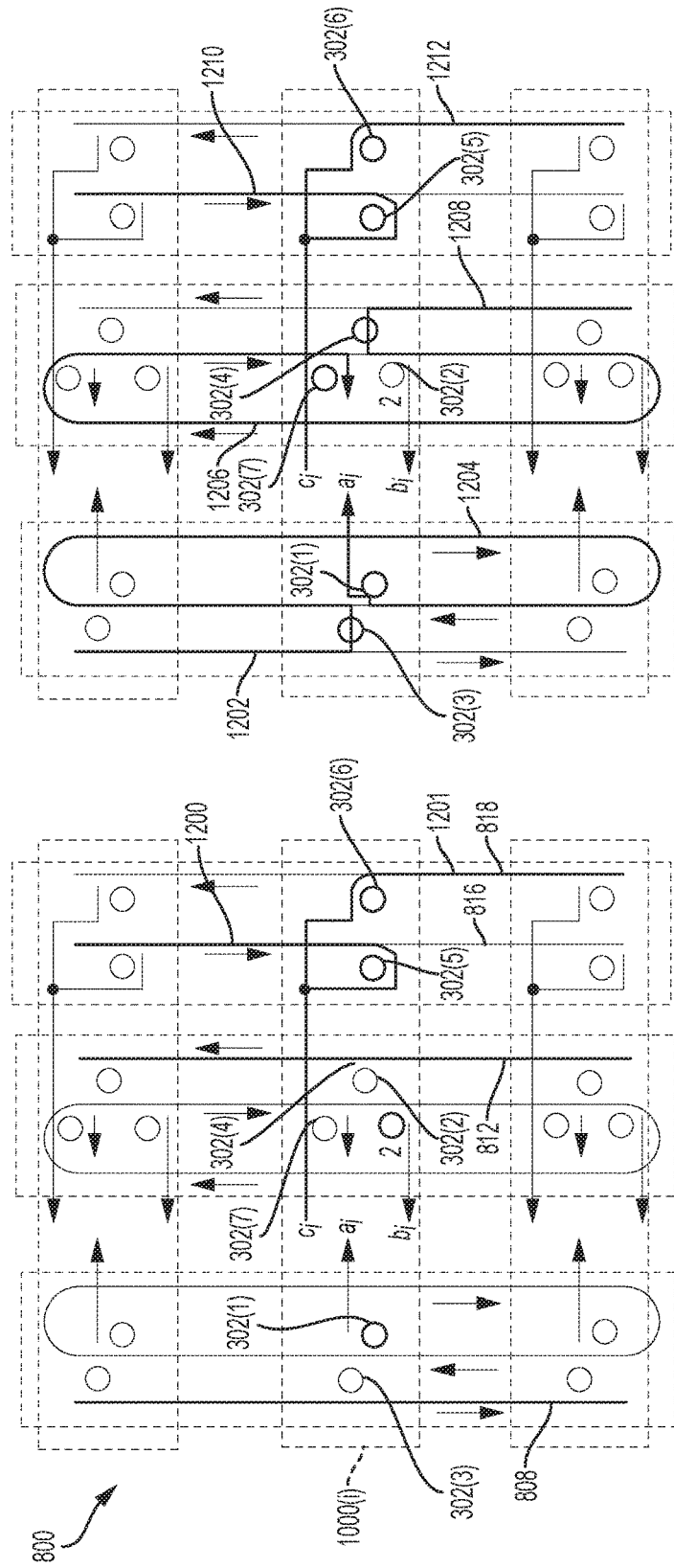

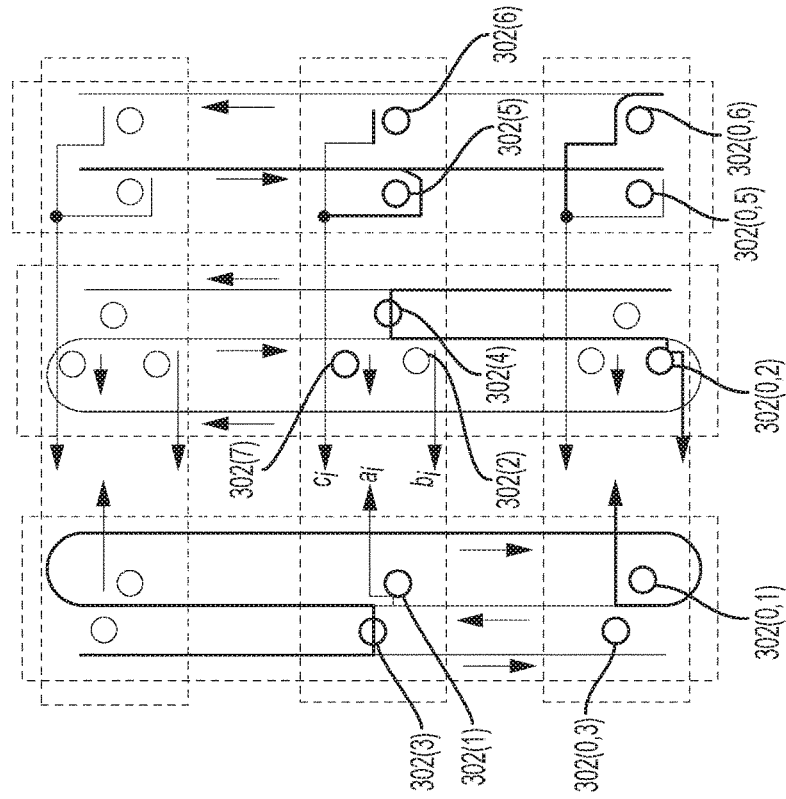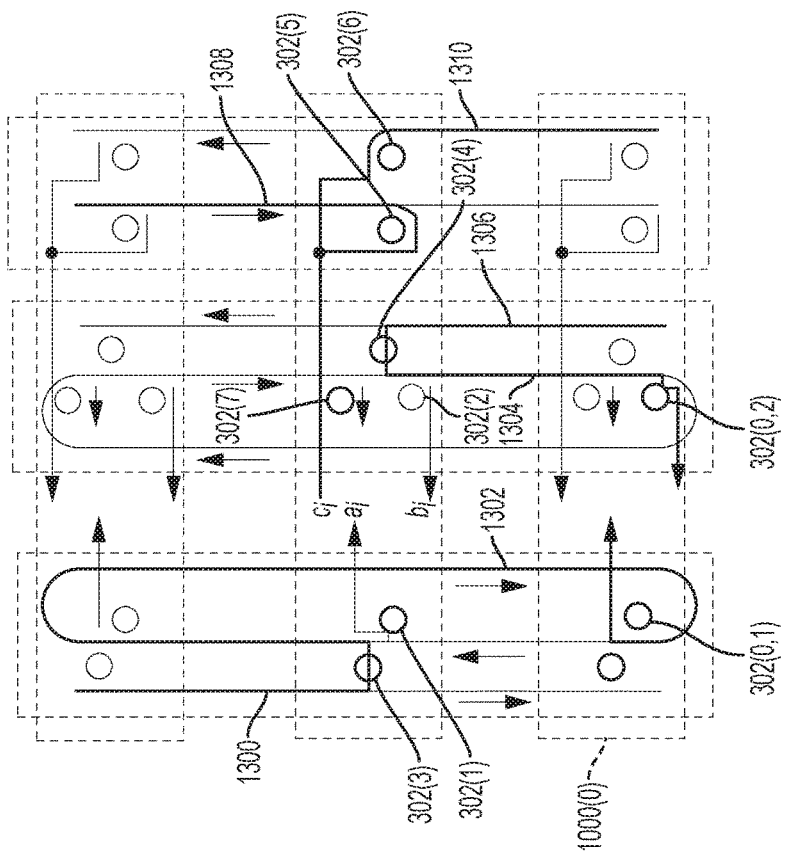

ASYNCHRONOUS DISTRIBUTED OPTICAL MUTUAL EXCLUSION INTERCONNECT AND METHOD

PRIORITY

This application claims the benefit of priority to U.S. Provisional Application No. 62/340,248, "ASYNCHRONOUS DISTRIBUTED OPTICAL MUTUAL EXCLUSION INTERCONNECT AND METHOD", filed May 23, 2016, which is incorporated herein by reference in its entirety.

TECHNICAL FIELD

The present application relates generally to an asynchronous distributed optical mutual exclusion interconnect.

BACKGROUND

Optical interconnects may function instead of or in compliment to other interconnects, such as electrical interconnects. Various architectures with optical interconnects are known in the art, including those for intra-chip communication employing optical waveguides and microring resonators. External lasers are used to inject light into a waveguide (often many wavelengths multiplexed) and the microring resonator functions as an electrically controllable switch that draws light out of the waveguide. Various such architectures utilize some form of external contention resolution, such as arbitration or an optical queue, which may be a complicated and/or resource-intensive structure to implement, for example, automatic buffering of optical packets arriving on different waveguides but in the same wavelength.

BRIEF DESCRIPTION OF THE DRAWINGS

FIGS. 12A and 12B illustrate a fair architecture having an element transitioning from a Busy state to a Leader state, in an example embodiment.

FIGS. 13A and 13B illustrate a fair architecture having an element implementing the Get_Fair_Token process starting from the condition of the fair architecture in FIG. 12B, in an example embodiment.

DETAILED DESCRIPTION

Example methods and systems are directed to an asynchronous distributed optical mutual exclusion interconnect. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without each or all of these specific details.

If independent processing elements can appropriately take turns to access a shared resource without conflict, then various external contention resolution mechanism may be eliminated. A system disclosed herein incorporates an optical architecture based on waveguides and microring resonators, to resolve contention for a shared resource, such as an optical waveguide. The microring resonators may be active microring modulators. The microring resonators, including the active microring modulators, may allow for light in a waveguide to be extracted in response to an electrical control signal. The system may function as a distributed optical semaphore that provides atomic and exclusive access to a critical region. Mutually exclusive access to the token or other shared resource has many applications, including in optical interconnects.

Optical interconnects may be useful in a variety of circumstances, including intra-chip or intra-module communication. Such systems may employ an external laser to supply unmodulated light, and information may be generated and consumed within the chip or module using microrings that act as electrically controllable taps on an optical waveguide. A system includes an optical architecture to implement a distributed semaphore. Specifically, in various examples the system distributes a token—which may function as a shared resource—mutually exclusively among n processors (which may be understood as users of the token). In various examples, the token is granted in constant amortized time following a request. The architecture of the system is distributed in the sense that nodes seeking the token may initiate and terminate token requests independently without centralized control. In various examples, the system is asynchronous, an in an example fully asynchronous, owing to an absence of needed coordination among requests for the token. Additionally, in various examples the distribution of tokens is "fair", with no token request being denied more than n−1 times in succession, n being the number of processors in the system.

Figure 1:
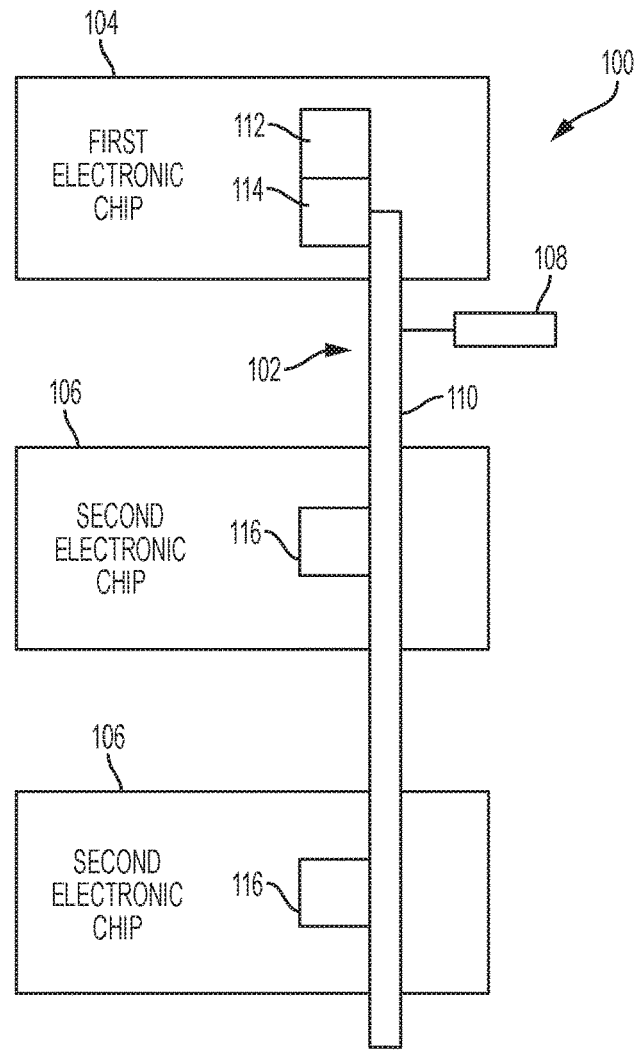
FIG. 1 is a block diagram of a system including an optical interconnect between a first electronic chip and one or more second electronic chips, in an example embodiment.

FIG. 1 is a block diagram of a system 100 including an optical interconnect 102 between a first electronic chip 104 and one or more second electronic chips 106, in an example embodiment. While first and second electronic chips 104, 106 are illustrated, it is to be recognized and understood that the system 100 may incorporate additional electronic chips coupled to the optical interconnect 102. Further, either or both of the first and second electronic chips 104, 106 may be, or may be replaced with electronic modules incorporating any of a variety of electronic hardware componentry in a variety of configurations, and/or one or more electronic modules may be coupled to the optical interconnect 102 according to the principles disclosed herein. Similarly, the first and second electronic chips 104, 106 and the optical interconnect 102 may be implemented, in whole or in part, on a single electronic chip. Moreover, it is to be understood that, while the first and second electronic chips 104, 106 are differentiated for the purposes of this disclosure to illustrate a transmitting chip and receiving chips, the first and second electronic chips 104, 106 may, in various examples, all be configured to transmit and receive optical signals, providing bi-directional signals between and among the first and second electronic chips 104, 106.

The optical interconnect 102 includes a laser 108 which emits unmodulated light onto a waveguide 110, such as one or more fiber optic lines or other suitable light transmission mechanisms. At least the first electronic chip 104, and in various examples some or all of the second electronic chips 106, include a driver circuit 112 which controls an optical coupler and modulator 114 which modulates the light from the laser 108 according to an electrical signal from the first electronic chip 104. An optical receiver element 116 of a second electronic chip 106, and in various examples of the first electronic chip 104 as well detects the light transmitted down the waveguide 110 and, where appropriate, converts the modulated light to electronic signals for subsequent use by or within the associated second electronic chip 106, as disclosed herein.

In various examples, the optical receiver elements 116 ("elements 116" herein) comprise n independent elements 116 with no synchronization among their activities. Each of these elements 116 is contending for a single token that is available in the system 100. The optical interconnect 102 is configured to grant access to the token to exactly one of the requesting elements 116.

The optical interconnect 102 is "fair" in that it uses a rotating priority to allot tokens. The optical interconnect 102 has a constant amortized response time per contention (assuming light can traverse distances in a chip in constant time). Moreover, the optical interconnect 102 is, in various examples, fully distributed in that each contending element 116 acts on the basis of information available to the element 116 locally, with no centralized control. The optical interconnect 102 may, in various examples, be understood to be an optical (hardware) semaphore that provides atomic and exclusive access to a critical region.

Mutual exclusion problems have been addressed in different contexts before. For example, one system utilizes optical queues to resolve contention among nodes for a wavelength. Another system utilizes arrayed waveguide grating routers to avoid centralized control and manage transmission permissions. Another system utilizes an optical arbitration scheme that is based on quotas over an epoch that provides max-min fairness in a network with differentiated service. Such systems do not work as a semaphore to provide atomic mutual exclusion. The literature in distributed computing itself is replete with examples of distributed mutual exclusion, and symmetry breaking techniques such as leader election. Starvation-free mutual exclusion has also been studied before, for example.

The optical interconnect 102 differs from other systems in that the optical interconnect 102 uses the law of conservation of energy as a means to ensure mutual exclusion. While technology dependent factors (such as resolution in regulating and distinguishing energy levels) may affect the speed with which a token request is resolved, mutual exclusion may not be compromised, provided the optical interconnect 102 operates without faults within tolerance levels. While alternative systems may utilize two arbitration schemes oriented towards communication on a ring topology, such alternative systems may not easily translate for general mutual exclusion use and may not be asynchronous. Additional alternative systems may utilize optical arbitration using oppositely directed waveguides, but assumes pipelining of n signals in the waveguide (for a system with n elements), which may not scale well. The optical interconnect 102, by contrast, is limited primarily by the delay and attenuation on the waveguide, which is small for inter-, or even intra-chip 104, 106 communication.

Assuming light can traverse distances in a chip 104, 106 in constant time, the optical interconnect 102 has a constant amortized response time per contention, with the response time defined as the time from a token request to a token grant. In various examples, the worst-case response time is $\Theta(n)$, however, this worst case occurs extremely rarely, in an example only when requests line up in a particularly unlikely manner. The optical interconnect 102 is fair in that it uses a rotating priority to allot tokens. Every element 116 requesting a token obtains the token within n token-cycles, defined as the maximum time for which an element holds the token. In an example, the optical interconnect 102 is fully distributed in that each contending element 116 acts on the basis of information available to the element 116 locally, without a need for centralized control. In an example, the optical interconnect 102 is fully asynchronous, in that the optical interconnect 102 makes no assumption about when the token is requested, granted or released.

When light is drawn out of a waveguide 110 by an element 116 upstream in the waveguide 110, then the optical interconnect 102 automatically prevents elements 116 downstream from accessing the light. In an example, the optical interconnect 102 includes various architectures, such as a base architecture, a token architecture that may be built on the base architecture, and a fair architecture that may be based on a combination of the base architecture and the token architecture to create the optical interconnect 102. As will be disclosed herein, the base architecture is a set of elements 116 connected to a waveguide 110 through microrings. With appropriate detection thresholds within the elements 116, the optical interconnect 102 provides that no two elements 116 receive the token simultaneously. However, the base architecture allows for an element 116 with the token to be preempted by another, higher priority, element; that is, elements 116 may, in various examples, be unable to hold on to the token. The base architecture is utilized to construct the token architecture, which allows an element 116 winning the token to hold the token as long as the element 116 wants. However, the token architecture can cause low-priority elements 116 to be starved, e.g., the low-priority elements 116 could be denied the token for an unbounded amount of time, even if the token is held for only a finite amount of time. The base and token architectures are utilized to construct the optical interconnect 102 that rotates element 116 priorities and distributes tokens equitably among elements 116. In an example, for an n-element 116 system 100, no element 116 requesting the token waits longer than n token-use cycles. For a uniform system 100, if the number of token requests is less than one per token service time, then the average wait time for each token request could be a constant. The principles disclosed with respect to the optical interconnect may be implemented as an optical queue required for the DCAF interconnect.

Figure 2:
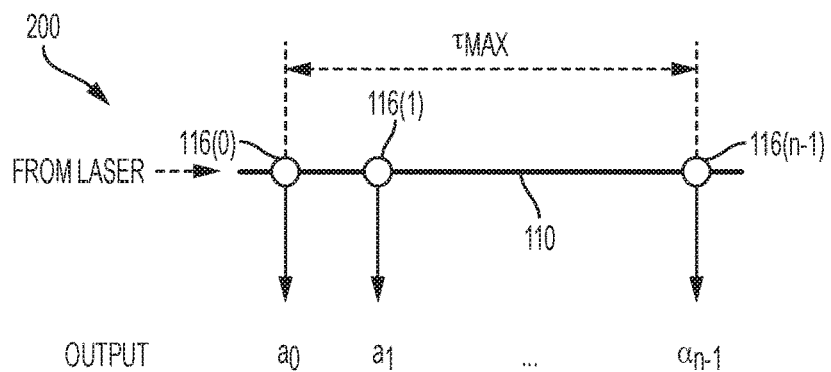
FIG. 2 is an illustration of a base architecture on which an optical interconnect may be based, in an example embodiment.

FIG. 2 is an illustration of a base architecture 200 on which the optical interconnect 102 may be based, in an example embodiment. The base architecture 200 includes n elements 116 (numbered 0, 1, . . . , n−1) connected to an optical waveguide 110. An external laser 108 (not pictured) injects unmodulated light into the waveguide 110 and each element i 116 produces a binary output $a_i \in \{0, 1\}$.

Figure 3A:
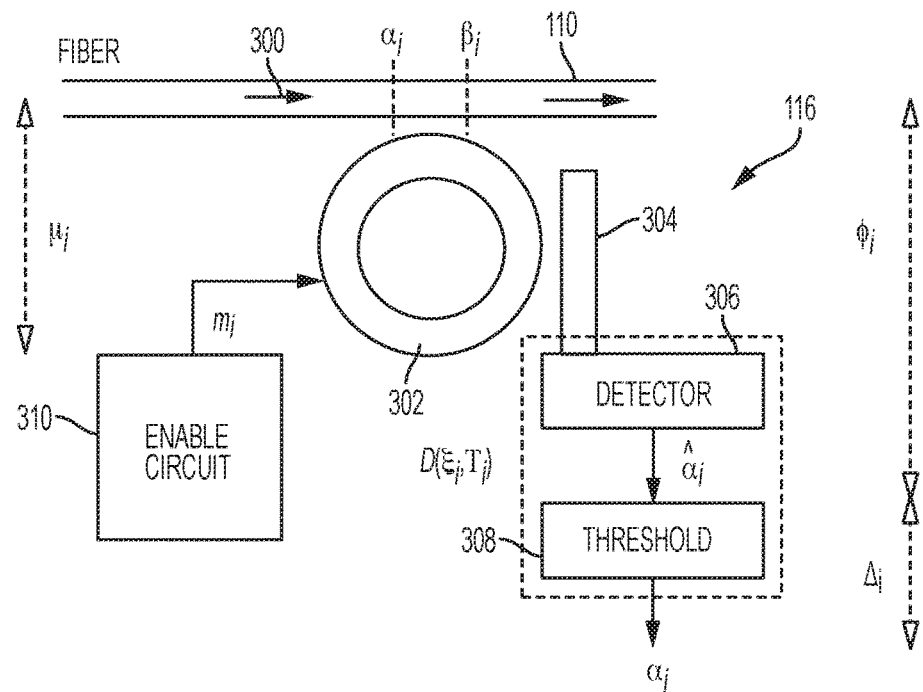
FIGS. 3A and 3B show detailed views of an optical receiver element, in an example embodiment.
Figure 3B:
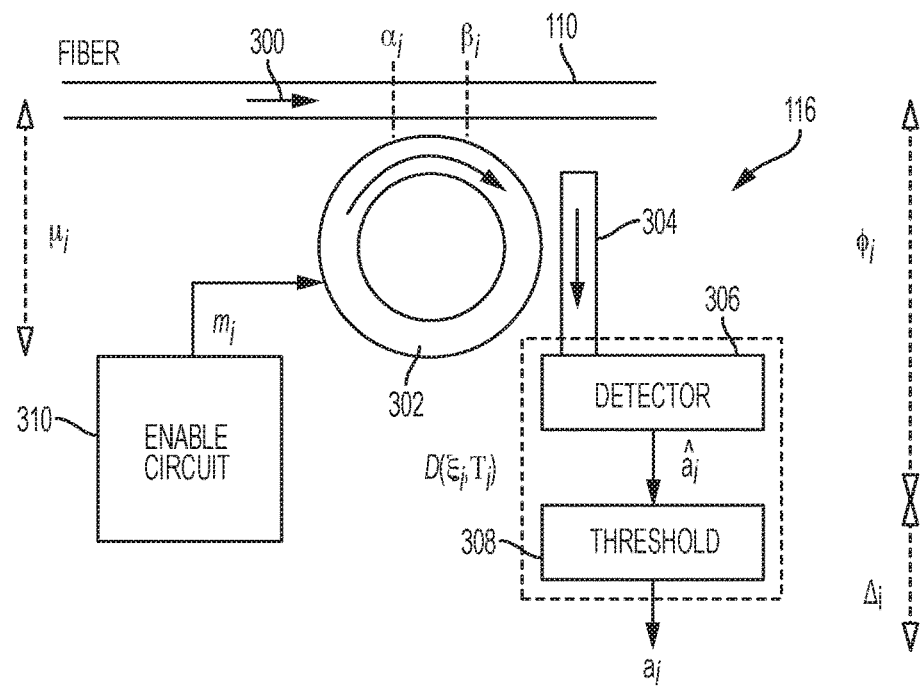

FIGS. 3A and 3B show detailed views of an optical receiver element 116, in an example embodiment. When the laser 108 injects one unit of light 300, which may be understood as a form of power, in the waveguide 110, at element i 116 the light 30 can be drawn from the waveguide 110 though a microring 302. A signal $m_i$ controls or "tunes" the microring 302. Specifically, when $m_i=1$, the microring 302 draws light 300, if any, passing through the waveguide 110, shown as points α, β; when $m_i=0$, the light 300 passes through the waveguide 110 unimpeded. Any light 300 drawn by the microring 302 is coupled to a secondary section 304 of the waveguide 110 and then directed to a photodetector 306. The electrical output of the detector 306 is an analog signal $\hat{a}_i$ that increases as more light is drawn from the waveguide 110. In an example, $a_{1/2}$ is a value of $\hat{a}_i$ that corresponds to drawing more than half of the light 300 injected into the waveguide 110.

A thresholding circuit 308 with input $\hat{a}_i$ produces a binary output $a_i$. Specifically for a signal level $\xi_i > a_{1/2}$ and delay $T_i$, the binary value output by the thresholding circuit at time t is $$a_i(t)=1 \text{ iff } \hat{a}_i(t') \geq \xi_i \text{ for all } t-T_i \leq t' \leq t \quad (1)$$

In an example, $a_i=1$ iff $\hat{a}_i$ has been above $\xi_i$ for at least $T_i$ time. The photodetector 306 and threshold circuit 308 may be denoted herein in combination by $D(\xi_i, T_i)$. The quantities $\xi_i$ and $T_i$ will be called the level and time thresholds, respectively, of $D(\xi_i, T_i)$. In various examples, in general, any level L>0 (instead of air) could be used for the level threshold. A smaller level may accommodate a larger system but may utilize a larger time threshold Ti. In an example, the element 116 includes or is associated with a processor (not illustrated) that may be utilized to generate the input to a enable circuit i 310, such as a latch or other suitable circuit, or consume $a_i$.

In an example, if the microring 302 of element i 116 is activated at time $t_i$. e.g., by setting $m_i=1$, and if the microring 302 of each element 0≤k<i 116 is deactivated ($m_k=0$), then for any time t≥$t_i$, the power received by the detector i 306 at time t may be a strictly increasing function π(t, $t_i$). That is, if the power in the waveguide 110 at point $\alpha_i$ is 1, then for the microring 302 activated as described above, the power at point $\beta_i$ is 1−π(t, $t_i$). In an example, $\pi(t, t_i)=1-e^{-\rho(t-t_i)}$, where $\rho>10^{12}$ s$^{-1}$. Thus, after a sufficiently large time (t−$t_i$), the light 300 from the waveguide 110 is fully or substantially fully diverted into the detector 306. In various examples, the time t is in the order of picoseconds.

In an example in which one unit of light 300 arrives at $\alpha_i$, $\mu_i$ may denote the time from when $m_i$ changes to a 1 to when the point $\beta_i$ has ½ units of light 300. Let $\phi_i$ be the time from when $\beta_i$ has ½ units of light 300 to when $\hat{a}_i = \xi_i > a_{1/2}$. Let $\Delta_i$ be the time from when $\hat{a}_i > \xi_i$ to $a_i$ becoming 1. Here $\Delta_i \geq T_i$ includes $T_i$, as shown in Equation (1) above, and additional delays such as the propagation delay of the threshold circuit itself. If $\hat{a}_i \leq \xi_i$, then $a_i$ may, in various examples, come to 0 effectively immediately, such as after a circuit delay and fall time of $\delta_i$; in general, $\delta_i$ may be a small time independent of the design parameter $T_i \leq \Delta_i$. The delays $\mu_i$, $\phi_i$, $\Delta_i$ between various components are depicted in FIGS. 3A and 3B.

Various timing parameters are provided in Table 1 below:

TABLE 1

| Timing parameters | |
|---|---|
| $\mu_{max}$ = | max{$\mu_i$: 0 ≤ i < n} |
| $\phi_{max}$ = | max{$\phi_i$: 0 ≤ i < n} |
| $\delta_{max}$ = | max{$\delta_i$: 0 ≤ i < n} |
| $\Delta_{max}$ = | max{$\Delta_i$: 0 ≤ i < n} |
| $\Delta_{min}$ = | min{$T_i$: 0 ≤ i < n} |
| ≤ | min{$\Delta_i$: 0 ≤ i < n} |

In various examples, some or all of $\mu_i$, $\phi_i$, $\Delta_i$ are invariant over 0≤i<n. The maximum and minimum quantities of Table 1, however, may account for variations in the components of the optical receiver element 116 (for example, due to manufacturing tolerances) in deriving bounds on the optical interconnect's 102 response time. Additionally, certain such quantities may be combined. In an example, $\sigma_i = \phi_i + \Delta_i$, then $$\sigma_{max} = \phi_{max} + \Delta_{max} \geq \max\{\phi_i + \Delta_i : 0 \leq i < n\}.$$

As noted above, where the base architecture 200 has n elements 116 numbered 0, 1, . . . , n−1 connected to the waveguide 110. In an example, a pair of elements 116 i and j (where 0≤i<j<n) and, as a result, element i 116 is placed upstream of element j 116 on the waveguide 110. In an example, $\tau_{i,j}$ is the time taken for light 300 to travel on the waveguide 110 from point $\beta_i$ (at the end of element i 116) to $\alpha_j$ (at the start of element j 116). Let $$\tau_{max} = \max\{\tau_{i,j} : 0 \leq i < j < n\}.$$

In various examples, with the proper selection of level and time thresholds $\xi_i$ and $T_i$, respectively, no two elements, i, j 116 of the base architecture 200 can simultaneously produce an output of $a_i = a_j = 1$. In various examples, the thresholds satisfy:

$$\xi_i > a_{1/2} \text{ and } \Delta_{min} = \min\{T_i : 0 \leq i < n\} > \tau_{max} + \phi_{max} \quad (2)$$

It is noted that the thresholds may be bounded from below. Consequently, the thresholds can be selected to be as large as necessary to accommodate technological constraints. Mutual exclusion, which may satisfy safety conditions, and termination, which may satisfy liveness conditions or the general efficient usefulness of the system 100, may not be affected by a large threshold; in an example, only a system response time is increased.

In an example, for any i<j and time t, if $\hat{a}_i(t) \geq \xi_i$ then at time $t' = t - \phi_i + \tau_{i,j} + \phi_j$, $\hat{a}_j(t') < \xi_j$. Since $a_i(t) \geq \xi_i > a_{1/2}$, at time $t - \phi_i$, more than half the power at point $\beta_i$ the waveguide 110 may have been drawn out by the microring 302 at element i 116. Then at time $t - \phi_i + \tau_{i,j}$, point $\alpha_j$ on the waveguide 110 has less than half units of power available to be drawn out. This implies that at time $t' = t - \phi_i + \tau_{i,j} + \phi_j$, photodetector 306 output $\hat{a}_j(t') < a_{1/2} < \xi_j$.

In an example where $m_i=1$ indicates a request by element i 116 for a token and $a_i=1$ indicates acquiring the token by element i 116, even if momentarily. Then the following result establishes that tokens may be acquired mutually exclusively in the base architecture 200. In particular, for the base architecture 200, if at any time t, $a_i(t)=a_j(t)=1$, then i=j. Without loss of generality, let i<j and let $a_i=1$. In various examples, $a_j(t)=0$. $(a_i=1) \Leftrightarrow \hat{a}_i(t') \geq \xi_i$, for all $t-T_i \leq t' \leq t \Rightarrow \hat{a}_i(t') \geq \xi_i$, for all, $t-\Delta_{min} \leq t' \leq t \Rightarrow \hat{a}_j(t'-\phi_i+\tau_{i,j}+\phi_j)<\xi_j$), for all $t-\Delta_{min} \leq t' \leq t$. The first inequality is from Equation (1). The next implication follows from the fact that $\Delta_{min} \leq T_i$. $t''=t-T_j \leq t'-\phi_i+\tau_{i,j}+\phi_j \leq \xi_j \leq t$, thereby showing that there exists time $t-T_j \leq t'' \leq t$ such that $\hat{a}_j(t'')<\xi_j$, thereby establishing that $a_j(t)=0$.

If $\tau_{i,j}+\phi_j-\phi_i \leq 0$, then:

$$t-T_j \leq t-\Delta_{min} < t-\tau_{max}-\phi_{max} \leq t-\tau_{i,j}-\phi_i < t+\tau_{i,j}-\phi_i+\phi_j \leq t \qquad (3)$$

Alternatively, if $\tau_{i,j}+\phi_j-\phi_i>0$, then $$t>t-\Delta_{min}+\tau_{max}+\phi_{max} \geq t-\Delta_{min}+\tau_{i,j}+\phi_j \geq t-\Delta_{min}+\tau_{i,j}+\phi_j-\phi_i > t-\Delta_{min} \geq t-T_j \qquad (4)$$

As such, the operation of the element 116 is illustrated between FIGS. 3A and 3B. In FIG. 3A, the enable circuit 310 and the resultant output m is set to a logical "0" to signal that the element 116 does not request the token and to not direct light into the microring 302, resulting in the light 300 passing the microring 302 and continuing on the waveguide 110. In FIG. 3B, the enable circuit 310 and resultant output m is set to a logical "1", reflecting that the element 116 has or is believed to have the token, resulting in the light 300 diverting into the microring 302 and secondary, separate section 304 of the waveguide 110 and into the detector 306. As a result, the light 300 does not continue down the waveguide 110.

As noted herein, the base architecture 200 can distribute tokens mutually exclusively. However, an element j 116 with the token may not be able to hold the token as any element i<j 116, i.e., placed upstream on the waveguide 110 could take the token away from j; this consideration is addressed in token architecture, disclosed in detail herein.

The response time of a mutual exclusion method is the time from the optical interconnect 102 receiving at least one token request to the time when the token is given to a requesting element 116. Because different instances of competing elements 116 result in different response times, the response time may be understood as a response time per token competition.

The response time of the base architecture 200 may be described as follows. At time t, let element j 116 request a token by setting $m_j(t)=1$ and at time t let $m_k(t)=0$, for all $0 \leq k<j$; in such an example, upstream elements 116 are not competing for the token at time t. Then a relatively small time $\in$ later, an element i 116 enters the competition and sets $m_i(t+\in)=1$. In various examples, element i 116 may prevent $a_j$ from becoming 1 by preventing $\in$ from being larger than a certain value. Without i in the competition, $a_j$ would become 1 at time $\mu_j+\phi_j+\Delta_j$.

In an example, at time $t+\mu_i+\tau_{i,j}$, point $\alpha_j$ on the waveguide 110 has at most ½ of the original light 300 and after another at most $\phi_j$ time, $\hat{a}_j$ falls below the level threshold $\xi_j$. This causes a $a_j$ to go to 0 after an additional $\delta_j$. Thus, the largest value of $\in$ after which i cannot prevent $a_j$ from becoming a 1 may be $$\mu_i+\tau_{i,j}+\phi_j+\delta_j \leq \mu_{max}+\tau_{max}+\phi_{max}+\delta_{max} < \mu_{max}+\delta_{max}+\Delta_{max}=t_{max} \qquad (4)$$

In an example, the response time of the base optical interconnect 102 is at most $(n-1)t_{max}$ for a single competition and at most $2t_{max}$ per competition, when amortized over a large number of competitions. In such an example, $t_{max}=\mu_{max}+\delta_{max}+\Delta_{max}$.

In various examples, as long as an element j 116 that has been competing for less than $t_{max}$, the element j 116 can be prevented by another element i<j 116 from getting the token (that is, making $a_j=1$). Such an effect can be cascaded through n−1 elements (starting from element n−1, then n−2 and so on until element 1), all of which may be prevented by the previous element from obtaining the token. Finally, element 0 116 obtains the token in $nt_{max}$ time.

If a competing element i 116 keeps $m_i=1$ until element i 116 receives the token, then the above situation with a $nt_{max}$ response time competition may be followed by n−1 competitions, each with at most $t_{max}$ response time. In various examples, only new competitors can increase the response time as indicated above. Since each competition results in one element 116 obtaining the token, the amortized response time over n competitions is $2nt_{max}$ or $2t_{max}$ per competition.

Figure 4:
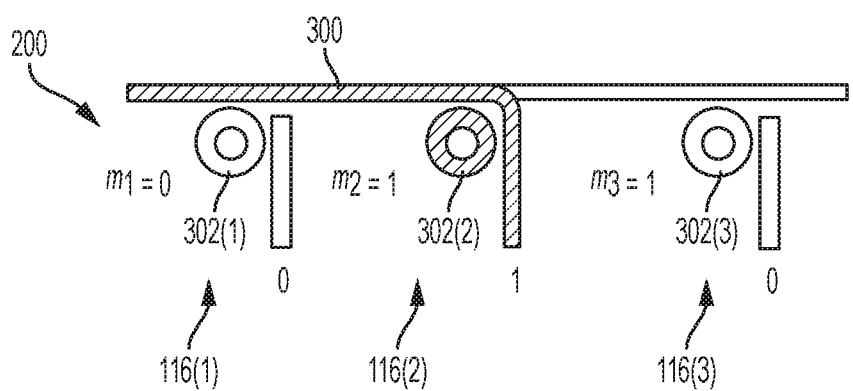
FIG. 4 is an illustration of an example operation of the base architecture, in an example embodiment.

FIG. 4 is an illustration of an example operation of the base architecture 200, in an example embodiment. In the illustrated example, a first element 116(1) has an enable setting $m_1=0$, a second element 116(2) has an enable setting $m_2=1$, and a third element 116(3) has an enable setting $m_3=1$. Because the light 300 on the waveguide 110 does not enter the first microring 302(1), the output $a_1$ of the first element 116(1) is 0. Because the light 300 on the waveguide 110 does reach the second microring 302(2), the output $a_2$ of the second element 116(2) is 1. Because the light 300 on the waveguide 110 does not reach the third microring 302(3), owing to the diversion of the light 300 to the second microring 302(2), the detector 306 (not pictured) of the third element 116(3) does not detect sufficient light 300 to meet the threshold condition for the third element 116(3), resulting in an output $a_3$ of 0.

Figure 5:
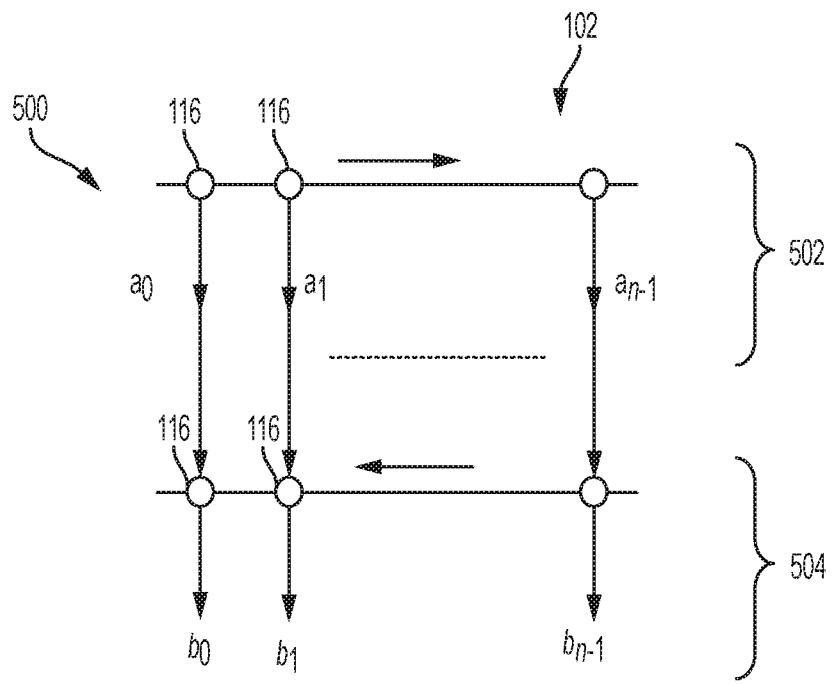
FIG. 5 is an illustration of a token architecture of an optical interconnect, in an example embodiment.

FIG. 5 is an illustration of a token architecture 500 of the optical interconnect 102, in an example embodiment. In various examples of the base architecture 200, elements 116 may exclusively obtain a token, but may not be able to hold the token if an upstream element 116 seizes the token. In an example, immediately after element j 116 sets $a_j=1$, an element i<j 116 could activate its microring 302, setting $a_i=1$ and causing $a_j$ to go to 0. The token architecture 500 utilizes the base architecture 200 as modified so that an element 116 may exclusively obtain a token and hold the token as long as the element 116 wishes. The token architecture may be understood to be an implementation of a distributed optical semaphore.

A first network 502 of the token architecture 500 represents an instance of the base architecture 200 that produces outputs $a_i$. A second network 504 is also an instance of the base architecture 200 with the lower index elements 116 downstream of those with higher indices.

In various examples of the token architecture 500, the first network 502 assigns a temporary token $a_i$ to element i 116 which it uses the access a permanent token $b_i$ through the second network 504. If element i 116 wins the token, then an element k<i 116 cannot wrest the token away from element i 116 as element k<i 116 is downstream of element i 116 in the second network 504. Additionally, elements j>i 116 cannot cause element i 116 to lose the token as elements j>i 116 are downstream of element i 116 in the first network 502 and cannot obtain the temporary token to access the second network 504.

Figure 6:
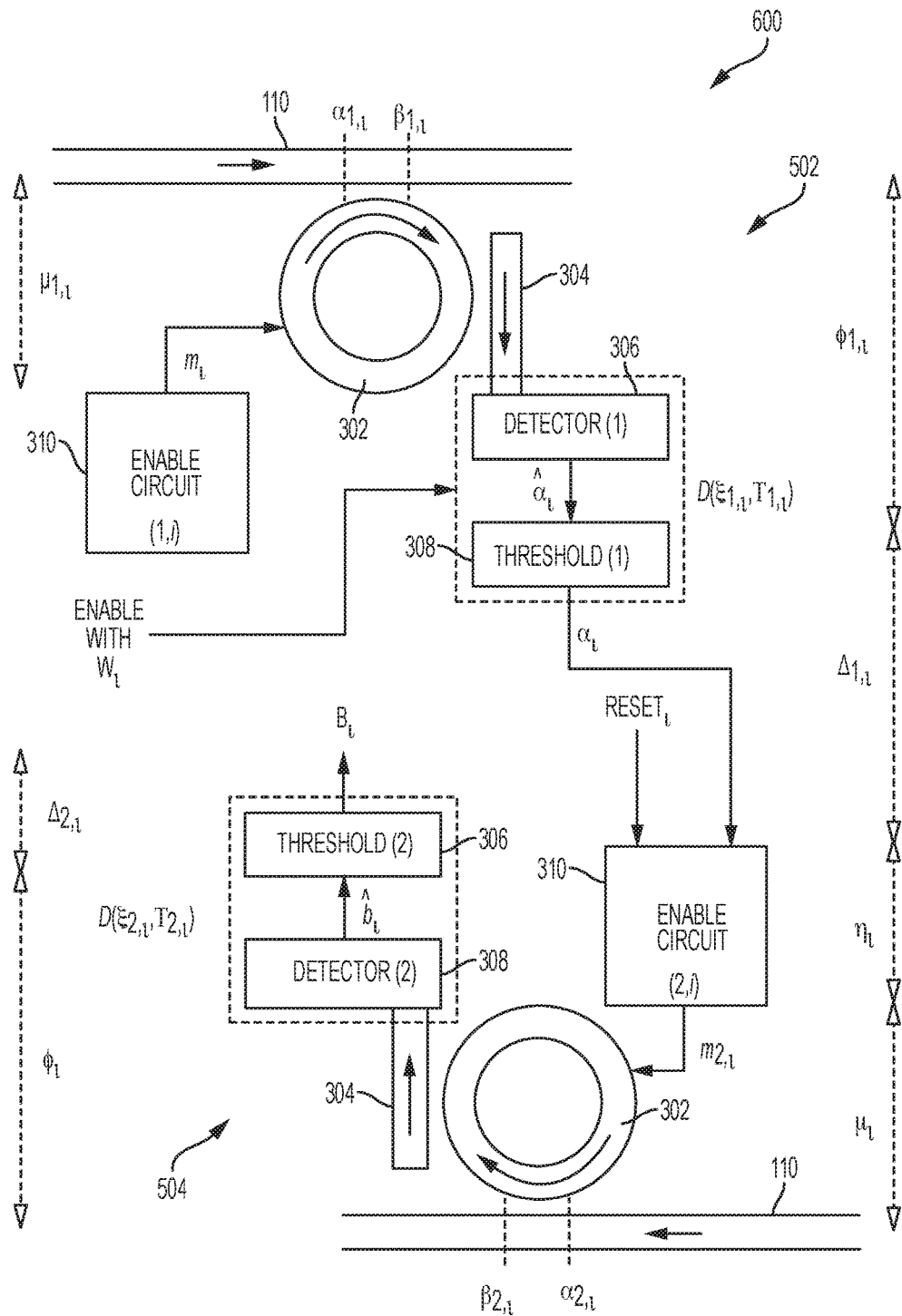
FIG. 6 details an optical receiver element of the token architecture which may be implemented as an element in an optical interconnect, in an example embodiment.

FIG. 6 details an optical receiver element 600 of the token architecture 500 which may be implemented as element i 116 in the optical interconnect 102, in various example embodiments. As noted earlier, the token architecture 500 consists of two instances of the base architecture 200, connected in tandem and, by extension the element 600 includes two instances of the element i 116 of the base architecture 200, illustrated in FIG. 3, coupled in tandem.

The element 600 may function as or include the enable circuit 310, in an example a latch, the operation of which is illustrated in Table 2:

TABLE 2

Enable circuit behavior of element 600

| reset$_i$ | $\alpha_{1,i}$ | next m$_{2,i}$ | Comment |
|---|---|---|---|
| 1 | — | 0 | reset latch output |
| 0 | 0 | m$_{2,i}$ | no change |
| 0 | 1 | 1 | latch set, until reset$_i$ = 1 |

In an example, the delay of the enable circuit 310 is $\eta_i$ and $\eta_{max}=\max\{\eta_i:0\leq i<n\}$. Other quantities such as $\mu_{1,max},\phi_{1,max}$ etc. may be defined similarly. Some or all of these quantities, except $\Delta_{1,max}$ and $\Delta_{2,max}$, may be independent of design parameters ($T_{1,i}$ and $T_{2,i}$) and depend only factors such as manufacturing tolerances and physical constants. Therefore, it may be unnecessary to distinguish between the first network 502 and the second network 504 and, as a result, $\mu_{max}=\max\{\mu_{1,max},\mu_{2,max}\}$ throughout the token architecture 600.

As before, the level thresholds satisfy $\xi_{1,i}>a_{1/2}$ and $\xi_{2,i}>b_{1/2}$. The time thresholds are set to satisfy:

$$\Delta_{1,min}>\tau_{max}+\phi_{max}+\delta_{max} \text{ and } \Delta_{2,min}>\eta_{max}+\tau_{max}+\phi_{max}+\delta_{max}+\mu_{max} \quad (5)$$

The reset input is used as follows. In an example, $$t_{reset}>\mu_{max}+\phi_{max}+\Delta_{max} \quad (6)$$

At time t, $m_{2,i}$ changes from 0 to 1. If after $t_{reset}$ time output $b_i(t+t_{reset})=0$, then reset$_i$ is asserted. In the absence on any competition for element 600, after $m_{2,i}$ changes to 1, at most $t_{reset}$ is needed for $b_i$ to change to a 1. If it has not yet changed, then an upstream element j>i 116 of the second network 504 is drawing the light 300 before the light 300 gets to i. In this case, resetting the enable circuit 310 causes i to compete all over again in the next competition cycle, without getting credit for setting $m_{2,i}$ to 1, as will be seen with respect to the fair architecture disclosed below. The flag $W_i$ indicating that element i 116 wishes to obtain the token is used to enable the detector output to microring (2, i) 302. While this may not needed for every potential implementation token architecture 500, the flag $W_i$ may be utilized in implementations of the token architecture 500 in the fair architecture in which a "leader" element 116 could otherwise cause a deadlock by tying up $a_i$ even when the leader element 116 does not seek the token. Alternatively, the enable circuit 310 of the second network 504 is not reset as described above.

In an example, the element 600 wishes to obtain the token (that is $m_{1,i}=1$) by setting the flag $W_i=1$. Table 3 shows a sample process of the operation of element 600. A preamble to the algorithm (enclosed in braces) specifies the condition to be satisfied for the algorithm to be executed. Comments are italicized and right justified. To release the token, element 600 simply deactivates its microrings 302 ($m_{1,i}=m_{2,i}=0$).

TABLE 3

Element 600 operation

| 1. | {W$_i$ = 1} | *PE i wants token* |
|---|---|---|
| 2. | m$_{b,i}$ ← 1; | *activate blue* |
| 3. | wait until a$_i$ = 1, then | |

TABLE 3-continued

Element 600 operation

| 4. | m$_{r,i}$ ← 1; | *activate red line 4 executed within a bounded time after a$_i$ = 1* |
|---|---|---|
| 5. | wait until b$_i$ = 1, then | |
| 6. | T$_i$ ← 1; | *token obtained* |

In various examples, the token architecture 500 distributes tokens mutually exclusively. In various examples, to obtain the token, element 600 has $b_i=1$. Because, the second network 504 is a basic architecture 200, no two elements i<j 116 can simultaneously have $b_i(t)=b_j(t)=0$, as disclosed herein.

In various examples, for some $t_{max}$ largely defined by $\Delta_{1,max}+\Delta_{2,max}$, the token architecture 500 has at most a worst case response time of $nt_{max}$ and an amortized response time $2t_{max}$, as described above. Unlike the base architecture 200, in the token architecture 500 if an element 600 obtains the token, then the element 600 can hold the token until the element 600 is ready to release the token.

In an example, if element 600 receive the token at time t ($b_i$ become 1 at time t) and for any t'≥t, let the second microring 302(2) be activated ($m_{2,i}(t')=1$). Then for any time t'≥t, element 600 holds the token at time t'($b_i(t')=1$). The condition that $m_{2,i}(t')=1$ is, in various examples, to provide that the token is not given up because element 600 wants to release the token, while also potentially ensuring that elements 116 downstream of element 600 have no effect on $b_i$.

For any element k>i, let $b_i(t)=1$ and for some k>i and $t_0>t$, $b_k(t_0)=1$; in certain examples, $b_i$ can thereby go to 0 prematurely, and in certain examples this is the only way in which $b_i$ can go to 0 prematurely. What causes $b_i$ to be 1 at time t is that $m_{2,j}$ is a 1 at time $t-\Delta_{2,i}-\phi_{2,i}-\mu_{2,i}$. That is, ($b_i(t)=1$) implies that $m_{2,j}(t-\Delta_{2,i}-\phi_{2,i}-\mu_{2,1})=1$). By extension, through points $\beta_{1,i},\alpha_{1,k}$ on the waveguide 110 of the first network 502 down to threshold output $a_k$, $b_i(t)=1$ implies that ($a_k(t-t_1)=0$, where $t_1=\Delta_{2,i}+\phi_{2,i}+\mu_{2,i}+n_i+\phi_{1,i}+(\Delta_{1,i}-\tau_{1,k}-\phi_{1,k}-\delta_{1,k})$. By Equation 5 above. $\Delta_{1,i}\geq\Delta_{1,min}>\tau_{max}+\phi_{max}+\delta_{max}$, so $$t_1>\Delta_{2,i}+\phi_{2,i}+\mu_{2,i}+\eta_i+\phi_{1,i}>\Delta_{2,i} \quad (7)$$

At time t, because element 600 drew energy from the waveguide 110 of the first network 502 to make $b_i(t)=1$, for a downstream element k, $a_k(t-t_1)=0$. Beyond time $t-t_1$, $a_k$ may never return to 1 as element 600, or some other element 116 upstream of element 600 on the waveguide 110 of the first network 502, may continue to draw the light 300 before the light 300 reaches element j. That is, for any t'≥t-t$_1$, $a_k(t')=0$. This means that ink may not change after time $t-t_1+\eta_k$.

In an example, $m_k(t-t_1+\eta_k)=0$. During the current competition, $m_k$ may not have changed to 1, as if $m_k$ did change to 1, element 600 cannot cause $m_k$ to change to a 0. Therefore, in such an example, this implies element k cannot take the token from element i.

Alternatively, $m_k(t-t_1+\eta_k)=1$. Element k 116 now begins to draw light 300 from the waveguide 110 of the second network 504, resulting in $b_i(t-t_1+\eta_k+\tau_{k,j}+\mu_{2,k}+\phi_{2,k}+\xi_{2,k})=0$. By Equation (7), this gives $$t_1-(\eta_k+\tau_{k,j}+\mu_{2,k}+\phi_{2,k}+\xi_{2,k})>\Delta_{2,i}-(\eta_k+\tau_{k,j}+\mu_{2,k}+\phi_{2,k}+\delta_{2,k})\geq\Delta_{min}-(\eta_{max}+\tau_{max}+\mu_{max}+\phi_{max}+\delta_{max})>0.$$

The last inequality follows from Equation (5). Thus, element k 116 can cause $b_i$ to become 0 at time $t-t_1+\eta_k+\tau_{k,j}+\mu_{2,k}+\phi_{2,k}+\delta_{2,k}=t$. This implies that, in various examples, at no time after that can $b_i$ become 1, as element 600 is downstream of element k 116 on the second network 504.

Figure 7:
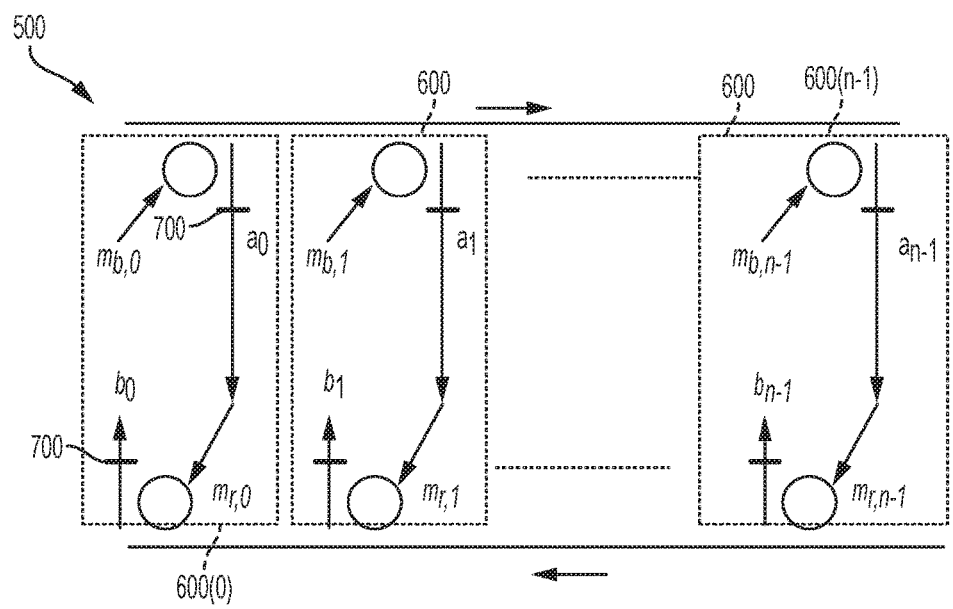
FIG. 7 is a schematic of a token architecture implemented with multiple elements, in an example embodiment.

FIG. 7 is a schematic of the token architecture 500 implemented with multiple elements 600, in an example embodiment. The elements 600 range from element 600(0) to element 600(n−1). The output of a circuit 700 including the detector 306 and the threshold circuit 308 (not pictured) sets the enable condition $m_{r,1}$ for an opposing microring 302 within each element 600. $W_i$=1 if and only if the element i 600 requests the token. $T_i$=1 if and only if the element i 600 holds the token. In such an implementation, the first network 502 assigns a temporary token to compete in the second network 504. The second network 504 assigns the final token. Per the process of Table 3, the element 600(0) has the highest priority and the element 600(n−1) has the lowest priority. The element 600(0) will always win in a competition to obtain the token with another element 600 and the element 600(n−1) will always lose a competition to obtain the token, if another element 600 competes for the token.

Figure 8:
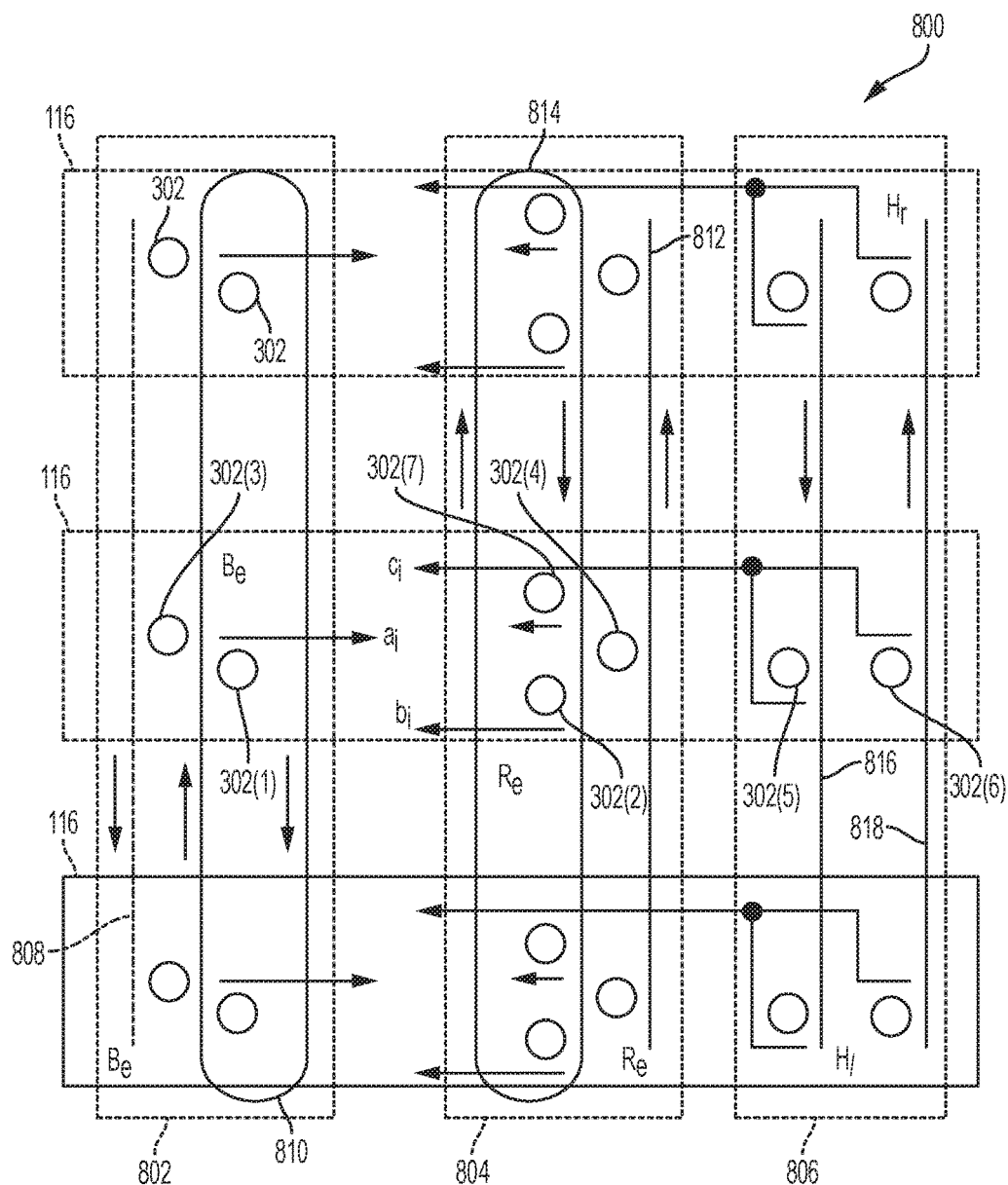
FIG. 8 is an illustration of a fair architecture implementation of an optical interconnect, in an example embodiment.
Figure 9:
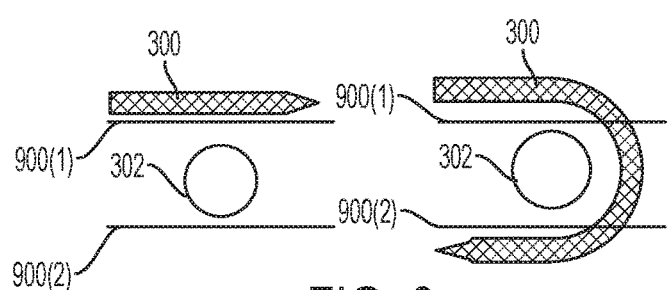
FIG. 9 is schematic depictions of the function of a microring coupled between two waveguides or coupled between two ends of the same waveguide, in an example embodiment.
Figure 10:
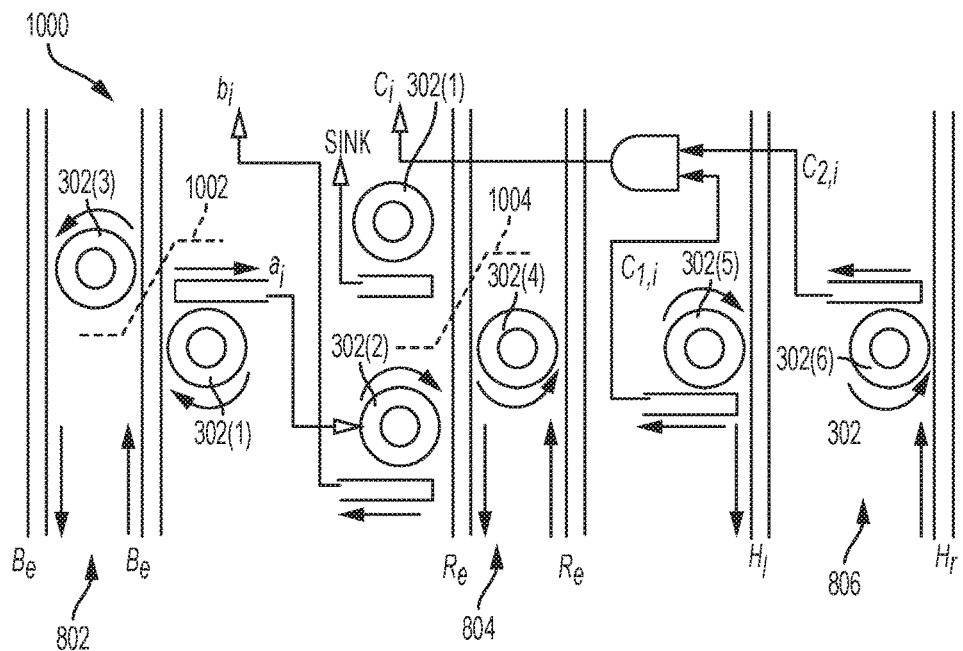
FIG. 10 is a schematic of an element of a fair architecture, in an example embodiment.

FIGS. 8-10 are illustrations of a fair architecture 800 implementation of the optical interconnect 102 at various levels of detail, in an example embodiment. To aid in the comprehensive description of the fair architecture 800, FIGS. 8-10 will be referred to below in conjunction with one another.

FIG. 8 is an illustration of a fair architecture 800 implementation of the optical interconnect 102, in an example embodiment. In various examples, each requesting element 116 of the fair architecture obtains a token at least once every n times, where n is the number of elements 116 in the fair network 800. While three total elements 116 are depicted, i.e., n=3, it is to be recognized and understood that the total number of elements 116 n may be any suitable number.

FIG. 9 is schematic depictions of the function of a microring 302 coupled between two waveguides 900(1), 900(2), or coupled between ends of the same waveguide 900, such as the waveguides 810, 814 of the fair architecture 800, in an example embodiment. In FIG. 9, when the microring 302 is in the disabled state. e.g., m=0, then light 300 on the waveguide 900(1) remains on the waveguide 900(1) and proceeds past the microring 302. In FIG. 9, when the microring 302 is in an enabled state, e.g., m=1, then light on waveguide 900(1) enters the microring 302 and is redirected onto the waveguide 900(2).

FIG. 10 is an implementation of an element 1000 of the fair architecture 800, in an example embodiment. The element 1000 may be implemented as any one or more of the elements 116, including element i 116, of the fair architecture 800. Referring to FIGS. 8-10 together, as in the token architecture 500, the fair architecture 800 has a first network 802 and a second network 804 that distribute the token to exactly one element 116 requesting the token; as with the token architecture 500, these networks 802, 804 produce output bits $m_i$ to enable the first network 802 and $b_i$ to access the token. The first and second networks 802, 804 are different from the related networks 502, 504 of the token architecture 500 in that the first and second networks 802, 804 can alter the effective relative positions of elements 116 on the waveguide 110. This employs an additional coordination step when the token is released by one element 116 and picked up by another element 116. For this a handover network 806 is used. At each competition, the logical structure of the fair architecture 800 is that of a token architecture 500, with the handover network 806 providing "fairness" between competitions, as disclosed herein.

The first network 802 has an external waveguide 808, into which an external laser injects unmodulated light. The first network 802 also has a circular waveguide 810, that carries light drawn from the external waveguide 808 $B_e$. In an example, only element 1000 has activated its microrings 302(1) and 302(3) placed at the waveguides 808, 810. Then the light from the external waveguide 808 is transferred by microring 302(3) to the circular waveguide 810. This light moves along circular waveguide 810 until the light is drawn out by microring 302(1). The net effect of this arrangement is to logically segment the circular waveguide 810 at the position shown by a dotted line 1002. In the illustrated example, microring 302(1) is a reading microring for the circular waveguide 810, the above configuration is equivalent to a waveguide 110 that traverses elements (i+x)(mod n), for 1≤x≤n (in order of increasing x); that is, it is a waveguide 110 that logically starts at element (i+1)(mod n) and ends at element i.

In the same manner, the second network 804 microring 302(4), when activated, transfers the light from an external waveguide 812 to a circular waveguide 814 and microring 302(7), when activated, draws light out of the circular waveguide 814. Thus, the circular waveguide 814 is logically segmented as shown by a dotted line 1004. With respect to microring 302(2) as the reading microring for the circular waveguide 814, the waveguide 814 logically traverses elements (i−x)(mod n), for 0≤x<n in order of increasing x. Collectively, the circular waveguides 810 and 814 constitute a logical token architecture 500.

The handover waveguides 816 and 818 run in different directions. If two elements i<j, each have microrings 302(5), 302(6) activated, then one, such as element i 116 would have $c_{1,i}$=1 and $c_{2,i}$=0, while the other element j 116 would have $c_{1,j}$=0 and $c_{2,j}$=1. For both elements $c_i$=$c_j$=0. Thus for any element i, $c_i$=1 if and only if element i 116 has activated its microrings 302(5), 302(6) and all other elements j≠i 116 have deactivated their microrings 302(5), 302(6).

At various times, the start and end point of the waveguides 808, 810, 812, 814 change, in various examples. Specifically, the waveguides 808, 810, 812, 814 place the previous token holder last on the first network 802 waveguides 808, 810 and first on the second network 804 waveguides 812, 814. The working of the fair architecture 800 can be understood in terms of five possible states of each of the n elements 116 in the fair architecture 800.

Figure 11:
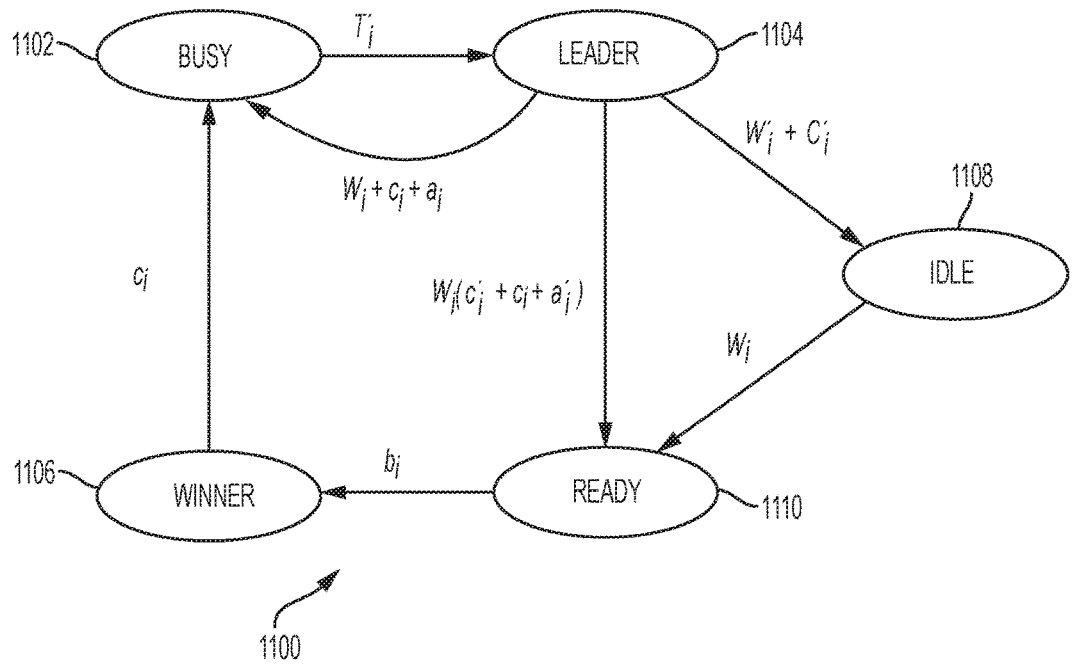
FIG. 11 is a state diagram of five states of the elements of the fair architecture, an example embodiment.

FIG. 11 is a state diagram 1100 of five states of the elements 1000 of the fair architecture 800, in an example embodiment. In an example, the state diagram 1100 accounts for the only five states of the elements 1000. An element 1000 moves between states based five flags: $T_i$ (holds token), $W_i$ (wishes to obtain the token), $a_i$ (output of the blue network), $b_i$ (output of the red network) and $c_i$ (handover signal). Each edge in the state diagram 1100 is labeled with a transition expressions that may be satisfied for the transition to occur. If no transition expression is satisfied, then it may be assumed that there is no state change. At any given point in time, there can be at most one element 1000 in the Busy state 1102, Leader state 1104, or Winner state 1106. However, several elements 1000 may be simultaneously be in the Idle state 1108 or Ready state 1110.

Four processes transition the elements 1000 through the five states. As in the token architecture 500, the processes specify the sequence of actions performed; some of the actions and the sequencing between them is performed automatically in hardware. Specifically, each process is executed when its starting condition (in braces at the head of the pseudo-code) is satisfied. However, once the process execution begins, the condition is no longer checked until the process execution is complete.

TABLE 4

Fair architecture 800 processes

Algorithm Free_Token (i)
1. $\{W_i = 0 \text{ and } T_i = 1\}$     element i has finished its use of the token
2. $T_i \leftarrow 0$;     no longer holds the token
3. $m_{i,2} \leftarrow 0$;     allows light into the red network
4. $m_{i,(3,4,7)} \leftarrow 1$     lines 3 and 4 collectively allow light into the blue and red networks Algorithm Get_Fair_Token (i)
1. $\{T_i = 0, c_i = 0, m_{i,(3,4,7)} = 0 \text{ and } W_i = 1\}$     element i is not the leader and wishes to obtain the token
2. if $b_i$ = Get_Token (i) = 1, then     call to token architecture algorithm
3.     $m_{i,(5,6)} \leftarrow 1$     seek handover
4.     wait until $c_i = 1$     wait for handover
5.     $T_i \leftarrow 1$     token obtained Algorithm Get_Fair_Token_Leader (i)
1. $\{T_i = 0, c_i = 1, W_i = 1 \text{ and } m_{i,(3,4,7)} = 1\}$     element i, the leader, wishes to obtain the token
2. if $a_i = 1$, then     Ring $m_{i,2}$ is activated due to a hardwired connection.
    Element i, being the first on the red network, will have $b_i = 1$.
3.     $m_{i,(3,4,7)} \leftarrow 0$;     lock the light out of the red and blue networks
4.     $T_i \leftarrow 1$     token obtained Algorithm Handover (i)
1. $T_i = 0, c_i = 0, m_{i,(3,4,7)} = 1\}$     element i hands over the leadership to another element
2. $m_{i,(1,3,4,7)} \leftarrow 0$;     removes itself from the start of the blue and end of the red networks
3. $m_{i,(5,6)} \leftarrow 0$;     releases the handover signal The processes of Table 4 are described with respect to element 1000(i) handing over to element 1000(0). The process is illustrated in FIGS. 12-15, as described herein.

In an illustrative example, initially, assume that some element $i_0$ holds the token. It will have $T_{i0}=W_{i0}=1$, $m_{i0,\{1,2,5,6\}}=1$ and $m_{i0,\{3,4,7\}}=0$. For all other elements $i \neq i_0$, $T_i=0$ initially and $m_{i,\{1,2,3,4,5,6,7\}}=0$. Initially, element $i_0$ 1000 is in the Busy state 1102 in which the element $i_0$ 1000 holding the token. All other elements 1000 are either in the Idle state 1108 and not seeking the token in the Ready state 1110 and seeking the token. Because microrings 302(3) and 302(4) are are turned off for all elements 1000, there is no light in the first and second networks 802, 804; this prevents any element 1000 in the Ready state 1110 from executing the code in process Get_Fair_Token beyond line 2. The conditions for executing the processes of Table 4 are not satisfied by the element $i_0$ 1000. Therefore, there is no state change until the element $i_0$ 1000 finishes using the token and sets $T_{i0}=0$.

In the Leader state, light 300 enters the first network 802 through microring 302(3) just after the element 1000 $i_0$ has a chance to tap into the first network 802. Thus, the order of elements 1000 on the first network 802 is $(i_0+k)(\bmod n)$, for k=1, 2, . . . , n. Similarly, the element 1000 $i_0$ is first on the second network 804 which order is $(i_0-k)(\bmod n)$ for k=0, 1, . . . , n−1. Thus, the fair architecture 800 has the leader element 1000 $i_0$ with lowest priority.

The Get_Fair_Token process waits at line 2, then exactly one of these $i_1$ receives $b_{i_1}=1$ and moves on to the Winner state 1106, waiting at line 4 for $c_{i_1}$ to become 1. Because the element $i_0$ 1000 has activated microrings 302(5) and 302(6), the current element $i_0$ 1000 in the Leader state 1104 finds that $c_{i0}=1$. It is noted that if two different processors activate the microrings 302(5) and 302(6), both processors get $c_i=0$. This causes the leader to execute the Handover process illustrated in FIG. 14.

The Handover process first removes the Leader element 1000 from its position at the end of the logical token architecture of the first and second networks 802, 804, and then releases the handover signal (line 3) so that $c_{i0}=0$ and $c_{i_1}=1$; the element $i_0$ 1000 now moves to the Idle state 1108 assuming the element $i_0$ 1000 is not seeking the token. This allows the winner to complete line 4 of the Get_Fair_Token process, obtain the token (line 5) and move to the busy state.

If after executing the Free_Token process, the leader decides that the token is needed again, the Leader element 1000 executes the Get_Fair Token_Leader process. This is similar to the Get_Fair_Token process, as executed by Ready elements 1000, except that the Leader element 1000 does not wait on $a_i$. The Leader element 1000 instead checks $a_i$ and exits the process, possibly executing the Get_Fair_Token process several times before element $i_1$ executes line 3 of the Get_Fair_Token process and $c_{i0}$ goes to 0. Alternatively, if the Leader element 1000 finds $a_{i_0}=1$, then the leader directly moves to being Busy again. The value of $a_{i_0}$, i.e., the output of the first network 802, is an indicator of whether the Leader element 1000 wins the competition, because the leader is at the start of the second network 804 and if the leader has $a_{i_0}=1$, then the leader receives $b_{i_0}=1$ without any further competition.

FIGS. 12A and 12B illustrate the fair architecture 800 having an element 1000(i) transitioning from the Busy state 1102 to the Leader state 1104, in an example embodiment. In this and subsequent figures, microrings 302 and waveguides 808-818 and portions thereof that are in bold lines are transmitting and admitting light 300 while microrings 302 and waveguides 808-818 and portions thereof that are not in bold lines are not admitting light 300 sufficient to register as logical data, as disclosed herein. As such, in FIG. 12A, to place the element 1000(i) in the Busy state, the microrings 302(1), 302(2), 302(5), and 302(6) are enabled (e.g., m=1) and waveguides 808, 812, and portions 1200, 1201 of waveguides 816, 818, respectively are transmitting light, as are secondary waveguides in the element 1000(i), while the remaining microrings 302 are disabled and secondary waveguides of the element 1000(i) and the other elements 1000 are not admitting or transmitting light 300.

FIG. 12B shows the element 1000(i) in the Leader state 1104 following implementation of the Free_Token algorithm. As illustrated, portions 1202, 1204, 1206, 1208, 1210, 1212 of the waveguides 808, 810, 812, 814, 816, 818, respectively, are receiving and transmitting light 300 and the microrings 302(1), 302(3), 302(4), 302(5), 302(6), 302(7) of the element 1000(i) are enabled. The remaining microrings 302 of the element 1000(i) and the other elements 1000 are disabled.

FIGS. 13A and 13B illustrate the fair architecture 800 having an element 1000(0) implementing the Get_Fair_Token process starting from the condition of the fair architecture 800 in FIG. 12B, in an example embodiment. In FIG. 13A, the microrings 302(1), 302(3), 302(4), 302(5), 302(6), and 302(7) are enabled, as are, from the element 1000(0), microrings 302(0,1) and 302(0,2) The remaining microrings 302 are not enabled. The portions 1300, 1302, 1304, 1306, 1308, 1310 of the waveguides 808, 810, 812, 814, 816, 818, respectively, are receiving and transmitting light 300. The state of the fair architecture 800 reflects the Get_Fair_Token process through the third step. FIG. 13B shows the element 1000(0) at the Handover step. In both FIGS. 13A and 13B, the element 1000(0) is in the Winner state 1106. In FIG. 13A, the element 1000(0) has not yet initiated the conditions that would cause the element 1000(i) to execute the Handover process as $C_i=1$. In FIG. 13B, the element 1000(0) has initiated the execution of the Handover process by 1000(i).

The fair architecture may be adapted in any of a variety of manners. In an example, the circular waveguides 810, 812 may each be replaced by a pair of linear waveguides, such as the waveguides 808, 812, 816, 818. Further, the optical detection thresholds may, in various examples, be ignored or otherwise eliminated from consideration by requiring the elements 1000 to implement a time delay in software. Safety margins can be built into these software-induced delays to ensure safety and liveness without impacting other criteria of the fair architecture 800, such as safe-assignment, non-preemption, and fairness.

Elements of the first network 802, the second network 804, and the handover network 806 may be implemented in the same waveguide using wavelength division multiplexing, allowing for a reduction in the waveguide resources. In an example, by using wavelength division multiplexing, the number of waveguides in the fair architecture 800 may be reduced to four waveguides or fewer. As a further consequence, the number of microrings 302 in each element 1000 may be reduced to four from the seven illustrated herein. In an example, microrings 302(3) and 302(4) may perform the work of the microrings 302(5) and 302(6), which may be removed from the elements 1000.

Figure 14:
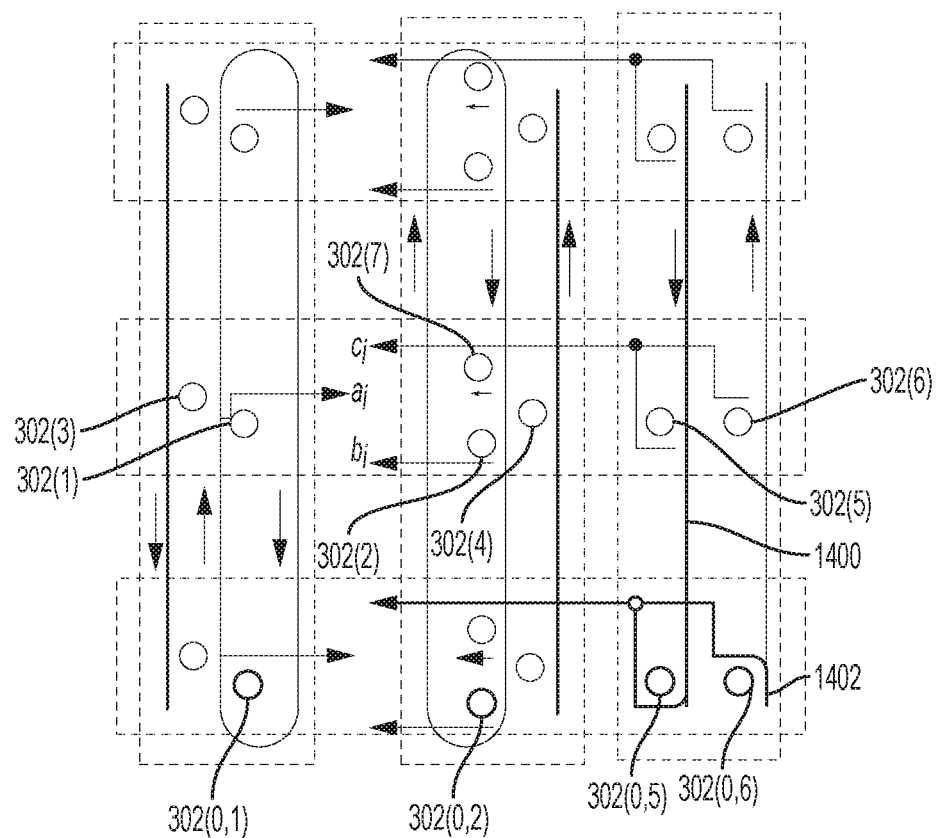
FIG. 14 illustrates the fair architecture implementing the Handover process from element $1000(i)$ to element $1000(0)$ during the Get_Fair_Token process, in an example embodiment.

FIG. 14 illustrates the fair architecture 800 implementing the Handover process from element 1000(i) to element 1000(0) during the Get_Fair_Token process, in an example embodiment. As illustrated, the Handover process produces a configuration of the fair architecture 800 that is substantially similar to that of the configuration of the fair architecture 800 in FIG. 12A, except that element 1000(0) has the token and is enabled rather than element 1000(i). The microrings 302(0,1), 302(0,2), 302(0,5), and 302(0,6) are enabled and the portions 1400, 1402 of the waveguides 816, 818 are receiving and transmitting light 300.

In light of the above description, the following results characterize various examples of the fair architecture 800. The fair architecture 800 distributes tokens mutually exclusively. When competition for the token begins. e.g. once the an element in the Busy state 1102 enters the Leader state 1104, the previous element 1000 in the Leader state 1104, which may currently be in inactive or in the Ready state 1110, is at the end of the logical bus, placing the previous element 1000 in the Leader state 1104 at the lowest priority in the competition. An element 1000 in the Ready state 1110 need wait no longer than n−1 competition cycles to enter the Winner state 1106. An element 1000 in the Winner state 1106 can become busy within a constant time of the appearance of an element 1000 in the Leader state 1104. The time when there is at least one Read state 1110 element 1000 and no element 1000 in the Busy state 1102 starts when an element $i_1$ 1000 is in the Ready state 1110 and at line 2 of the Get Fair Token process and $i_0$ is entering the Free Token process. This period ends when the element $i_1$ 1000 executes line 5 of the Get Fair Token process. In the interim the element 1000 in the Ready state 1110 has to wait for $a_{i_1}=1$ and $b_{i_1}=1$, e.g., the response time of the logical token architecture. The rest of the process may take constant time. Finally, in various examples, assuming constant propagation delay for light in the system 100 ($\tau_{max}$ is constant), the response time of the fair architecture 800 is at most O(n) for a single competition and constant per competition, when amortized over a large number of competitions.

The fair architecture 800 can be modeled as follows. The n elements 1000, implemented as the elements 116 numbered 0, 1, . . . , n−1 of the system 100 are arranged in a ring. A pointer 0≤ξ(t)<n points to an element 116 of this ring. The value of this pointer may change over time. At time t, element (ξ(t)+x)(mod n) (where 0≤x<n) has priority x; the lower the value of x, the higher the priority. Among all elements requesting the token at time t, assuming the token is available, the element (ξ(t)+x)(mod n) with the smallest value of x receives the token. After this element 116 returns the token at time t'>t, the value of (t') is (ξ(t)+1)(mod n). Thus the element 116 receiving the token has the lowest priority the next time around.

For the following analysis, a uniform system 100 is assumed in which all elements 116 acquire and hold the token for the same time, assumed to be unity. and that the elements 116 generate token requests at the same rate $$\frac{\lambda}{n}.$$

If the token requests follow a Poisson arrival, then it can be shown that the token requests on the entire system 100 is also Poisson with arrival rate λ. If λ<1, where 1 is the service time including overheads for acquiring the token, the average length of the system queue, e.g., the sum of all individual queues, is $$\frac{\lambda^2}{2(1-\lambda)}.$$

This queue length is a constant if λ≤c, for some constant c<1.

Since the system 100 is assumed uniform and element 116 priorities are rotated, the average individual wait time to access the token is also a constant.

It is noted that in practice an element that is not tuned to draw light out of a waveguide may still attenuate the light by a small amount. Over a series of elements 1000, the light may be attenuated to be below the level threshold. Thus, the number of elements 1000 in the fair architecture may be bounded. However, the bound on the number of elements 1000 may be increased by lowering the threshold level and increasing the time threshold correspondingly. That is, the system can trade off the number of elements 1000 supported with the system speed.

Figure 15:
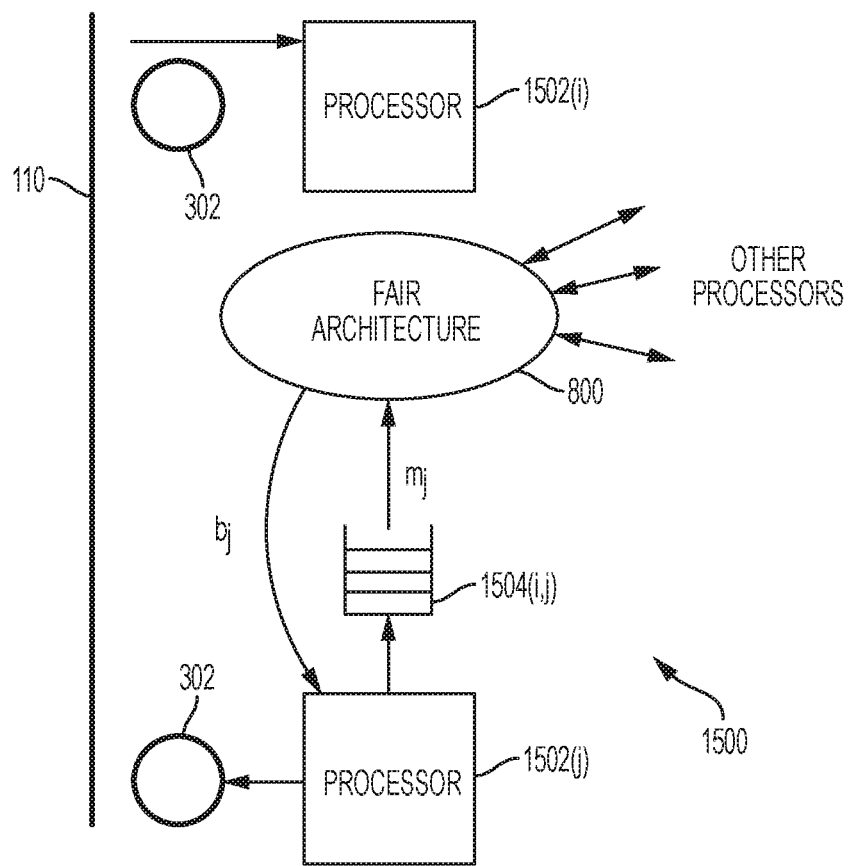
FIG. 15 is an illustration of a fair architecture within a directly connected arbitration-free (DCAF) photonic crossbar system, in an example embodiment.

FIG. 15 is an illustration of the fair architecture 800 within a directly connected arbitration-free (DCAF) photonic crossbar system 1500, in an example embodiment. The DCAF On-Chip Optical Interconnect constructs a completely connected optical network in which each processor, e.g., an element 116, can receive data on a fixed set of wavelengths but can transmit data in all n sets of wavelengths. Specifically, if $\Lambda_i$ is a set of wavelengths (one per bit in the word or physical transfer digit or "phit" transmitted) associated with processor 1502(*i*), then any processor $p_j$ wishing to transmit to processor 1502(*i*) used the wavelengths in $\Lambda_i$. This could result in multiple simultaneous transmissions to processor 1502(*i*) all on the same set of wavelengths, albeit different on different waveguides 110. DCAF uses an optical queue to automatically resolve and buffer these contending packets.

The fair architecture 800 can substitute the optical queue. The receiving processor 1502(*i*) has an n-element fair architecture associated with it 800, instead of an n-input optical queue. Each processor 1502(*i*) with a packet or flit to send to processor 1502(*i*) keeps this information on this packet (just identifying information without the payload) in an electrical output queue 1504(*i,j*). When electrical output queue 1504(*i,j*). has enough information to send optically, for instance when the queue size exceeds a threshold, processor 1502(*i*) sends a signal $m_j$ to compete for the token. When the processor 1502(*i*) receives the token ($b_j=1$) it generate the data and send it optically using wavelengths $\Lambda_i$ exclusively.

Thus this communication may be bufferless in the optical domain. While local storage is still electrical data transport is performed optically (which is where the primary advantage of optics over electric lies).

For n-processors 1502 and a data width of w, DCAF may uses $n^2w$ microrings (n optical queues). Adding the fair architecture may introduce (at most) $7n^2$ microrings 302 over the network. This is just a 7/w increase over the original network, not counting the savings in the cost of the optical queue. For example with w=64 this increase is about eleven (11) percent for avoiding optical queues. This can be further reduced to $4n^2$ microrings 302, decreasing the percentage increase in the above example to 6.25%. Microrings 302 may also be reused with in the DCAF system 1500, potentially further reducing the cost of the system 1500 by approximately seven (7) percent Further, in various examples, no synchronization may be needed among the contenders for the token. Thus the wires for $m_j$ and $b_j=1$ may be relatively thin in comparison with other systems without problems for skew or signal rate. Thus, placing processors 1502(*i*) and 1502(*j*) far apart may not pose a technical problem.

Figure 16:
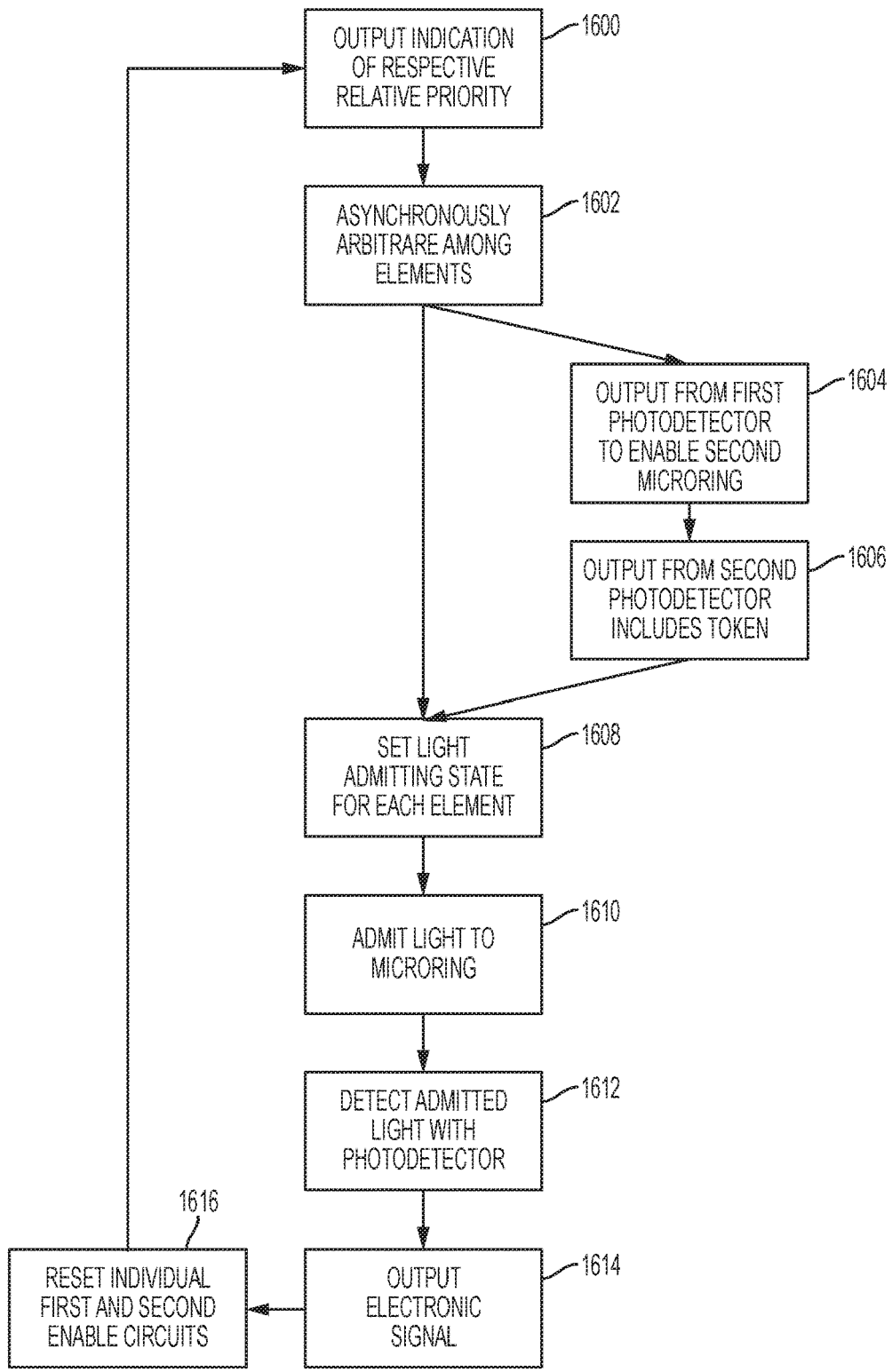
FIG. 16 is a flowchart for operating an asynchronous distributed optical mutual exclusion interconnect and related system, in an example embodiment.

FIG. 16 is a flowchart for operating an asynchronous distributed optical mutual exclusion interconnect and related system, in an example embodiment. While the flowchart is described with respect to the system 100 and the various architectures 200, 600, 800, it is to be recognized and understood that the flowchart may be implemented with respect to any suitable system and/or architecture.

At 1600, an indication of the respective relative priority of each optical receiver elements is output, from a handover network, to the optical receiver elements, wherein the handover network comprises a first handover waveguide, a second handover waveguide, and, for at least some of the optical receiver elements, corresponding first and second handover microrings coupled to the first and second handover waveguides, respectively, configured to output. In an example, the first handover waveguide directs light in a first direction, the second handover waveguide directs light in a second direction opposite the first direction, and wherein outputting the indication of the respective relative priority includes logically combining outputs from each of the first and second handover microrings to indicate one of the optical receiver elements having a highest overall priority.

At 1600, optical receiver elements asynchronously arbitrating among one another for a token according to a relative priority of each of the optical receiver elements, wherein each optical receiver element is coupled between a first waveguide and a second waveguide. In an example, asynchronously arbitrating among optical receiver elements comprises the optical receiver elements dynamically and asynchronously reassigning the relative priority of the optical receiver elements with respect to one another. In an example, the microring is a first microring coupled to the first waveguide, the photodetector is a first photodetector coupled to the first microring, and the enable circuit is a first enable circuit, wherein the optical receiver elements further comprise a second microring coupled to the second waveguide, a second photodetector coupled to the second microring, and a second photodetector coupled to the second microring, wherein the first enable circuit is coupled to the second microring.

At 1602, an output of the first photodetector to the second enable circuit, the first output including a temporary token configured to cause the second enable circuit to permit light from the second waveguide to enter the second photodetector via the second microring. In an example, the first waveguide directs light in a first direction and the second waveguide directs light in a second direction opposite the first direction, and wherein establishing the relative priority of the optical receiver elements I based on the relative position of the optical receiver elements with respect to a light source originating light on the first waveguide.

At 1604, an output is generated, with the second photodetector, including the token based on the relative priority of the associated optical receiver element.

At 1602, for each optical receiver element, a light admitting state is set, with an enable circuit of the optical receiver element, to enable light to be admitted to a microring of the optical receiver element and a light rejection state to prevent light from being admitted to the microring.

At 1604, light is admitted, based on the enable circuit being set to the light admitting state, from at least one of the first and second waveguide into the microring.

At 1606, the light admitted to the microring is detected with a photodetector of the optical receiver element having the enable circuit set to the light admitting state.

At 1608, an electronic signal indicative of the light detected with the photodetector is output from a threshold circuit of the optical receiver element coupled to the photodetector.

At 1610, individual ones of the first and second enable circuits of the individual optical receiver elements are reset, with a processor, to release the token possessed by one of the respective optical receiver elements.

While various embodiments have been described, the description is intended to be exemplary, rather than limiting and it will be apparent to those of ordinary skill in the art that many more embodiments and implementations are possible that are within the scope of the present disclosure. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A system, comprising:
   a first waveguide;
   a second waveguide;
   optical receiver elements coupled between the first waveguide and the second waveguide, each optical receiver element comprising:
      a microring configured to admit light from and transfer light to at least one of the first and second waveguides;
      a photodetector, coupled to the microring, configured to detect light admitted to the microring; and
      a enable circuit, coupled to the microring, configured to be switched between a light admitting state to enable light to be admitted to the microring and a light rejection state to prevent light from being admitted to the microring;
      wherein each optical receiver element has a relative priority with respect to one another and are configured to asynchronously arbitrate among the optical receiver elements for a token to place one of the enable circuits in the light admitting state to enable one of the optical receiver elements to receive and transmit data along the first and second waveguides based on the relative priority among the optical receiver elements.

2. The system of claim 1, wherein the optical receiver elements are configured to dynamically and asynchronously reassign the relative priority of the optical receiver elements with respect to one another.

3. The system of claim 2, further comprising a handover network comprising a first handover waveguide, a second handover waveguide, and, for at least some of the optical receiver elements, corresponding first and second handover microrings coupled to the first and second handover waveguides, respectively, configured to output to the optical receiver elements an indication of the respective relative priority of each optical receiver elements.

4. The system of claim 3, wherein the first handover waveguide directs light in a first direction, the second handover waveguide directs light in a second direction opposite the first direction, and wherein outputs from each of the first and second handover microrings are logically combined to indicate one of the optical receiver elements having a highest overall priority.

5. The system of claim 1, wherein the microring is a first microring coupled to the first waveguide, the photodetector is a first photodetector coupled to the first microring, and the enable circuit is a first enable circuit, wherein the optical receiver elements further comprise:
   a second microring coupled to the second waveguide;
   a second photodetector coupled to the second microring; and
   a second enable circuit coupled to the first microring;
   wherein the first enable circuit is coupled to the second microring;
   wherein an output of the first photodetector is coupled to the second enable circuit, the first output including a temporary token configured to cause the second enable circuit to permit light from the second waveguide to enter the second photodetector via the second microring, and wherein the second photodetector is configured to generate an output including the token based on the relative priority of the associated optical receiver element.

6. The system of claim 5, wherein the first waveguide directs light in a first direction and the second waveguide directs light in a second direction opposite the first direction, and wherein the relative position of the optical receiver elements with respect to a light source originating light on the first waveguide establishes the relative priority of the optical receiver elements.

7. The system of claim 6, further comprising a processor configured to reset individual ones of the first and second enable circuits of the individual optical receiver elements to release the token possessed by one of the respective optical receiver elements.

8. A method, comprising:
   asynchronously arbitrating among optical receiver elements for a token according to a relative priority of each of the optical receiver elements, wherein each optical receiver element is coupled between a first waveguide and a second waveguide;
   for each optical receiver element, setting, with an enable circuit of the optical receiver element, a light admitting state to enable light to be admitted to a microring of the optical receiver element and a light rejection state to prevent light from being admitted to the microring;
   admitting, based on the enable circuit being set to the light admitting state, light from at least one of the first and second waveguide into the microring;
   detecting, with a photodetector of the optical receiver element having the enable circuit set to the light admitting state, the light admitted to the microring; and
   outputting, from a threshold circuit of the optical receiver element coupled to the photodetector, an electronic signal indicative of the light detected with the photodetector.

9. The method of claim 8, wherein asynchronously arbitrating among optical receiver elements comprises the optical receiver elements dynamically and asynchronously reassigning the relative priority of the optical receiver elements with respect to one another.

10. The method of claim 9, further comprising:
    outputting, from a handover network, to the optical receiver elements an indication of the respective relative priority of each optical receiver elements, wherein the handover network comprises a first handover waveguide, a second handover waveguide, and, for at least some of the optical receiver elements, corresponding first and second handover microrings coupled to the first and second handover waveguides, respectively, configured to output.

11. The method of claim 10, wherein the first handover waveguide directs light in a first direction, the second handover waveguide directs light in a second direction opposite the first direction, and wherein outputting the indication of the respective relative priority includes logically combining outputs from each of the first and second handover microrings to indicate one of the optical receiver elements having a highest overall priority.

12. The method of claim 8, wherein the microring is a first microring coupled to the first waveguide, the photodetector is a first photodetector coupled to the first microring, and the enable circuit is a first enable circuit, wherein the optical receiver elements further comprise:
    a second microring coupled to the second waveguide;
    a second photodetector coupled to the second microring; and a second enable circuit coupled to the first microring;
wherein the first enable circuit is coupled to the second microring;
further comprising:
coupling an output of the first photodetector to the second enable circuit, the first output including a temporary token configured to cause the second enable circuit to permit light from the second waveguide to enter the second photodetector via the second microring; and
generating, with the second photodetector, an output including the token based on the relative priority of the associated optical receiver element.

13. The method of claim 12, wherein the first waveguide directs light in a first direction and the second waveguide directs light in a second direction opposite the first direction, and wherein establishing the relative priority of the optical receiver elements based on the relative position of the optical receiver elements with respect to a light source originating light on the first waveguide.

14. The method of claim 13, further comprising resetting, with a processor, individual ones of the first and second enable circuits of the individual optical receiver elements to release the token possessed by one of the respective optical receiver elements.

15. An optical receiver element, comprising:
a microring configured to admit light from and transfer light to a waveguide;
a photodetector, coupled to the microring, configured to detect light admitted to the microring; and
a enable circuit, coupled to the microring, configured to be switched between a light admitting state to enable light to be admitted to the microring and a light rejection state to prevent light from being admitted to the microring;
wherein the optical receiver element has a relative priority with respect to other optical receiver elements and is configured to asynchronously arbitrate among the optical receiver elements for a token to place the enable circuits in the light admitting state to enable the microring to receive and transmit data along the waveguide based on the relative priority among the optical receiver elements.

16. The optical receiver element of claim 15, wherein the optical receiver element is configured to dynamically and asynchronously reassign the relative priority of the optical receiver elements with respect to the other optical receiver elements.

17. The optical receiver element of claim 16, further comprising first and second handover microrings coupleable to first and second handover waveguides, respectively, the first and second handover microrings configured to output to the optical receiver elements an indication of the respective relative priority of each optical receiver elements.

18. The optical receiver element of claim 17, wherein outputs from each of the first and second handover microrings are logically combined to indicate if the optical receiver elements has a highest overall priority.

19. The optical receiver element of claim 15, wherein the microring is a first microring coupeable to the waveguide, wherein the waveguide is a first waveguide, the photodetector is a first photodetector coupled to the first microring, and the enable circuit is a first enable circuit, wherein the optical receiver element further comprises:
a second microring coupleable to a second waveguide;
a second photodetector coupled to the second microring; and
a second enable circuit coupled to the first microring;
wherein the first enable circuit is coupled to the second microring;
wherein an output of the first photodetector is coupled to the second enable circuit, the first output including a temporary token configured to cause the second enable circuit to permit light from the second waveguide to enter the second photodetector via the second microring, and wherein the second photodetector is configured to generate an output including the token based on the relative priority of the optical receiver element.

20. The optical receiver element of claim 19, wherein the first waveguide directs light in a first direction and the second waveguide directs light in a second direction opposite the first direction, and wherein the relative position of the optical receiver element is with respect to a light source originating light on the first waveguide establishes the relative priority of the optical receiver elements.

* * * * *